(12) United States Patent
Dextreit

(10) Patent No.: US 9,205,831 B2
(45) Date of Patent: Dec. 8, 2015

(54) CONTROLLER AND METHOD OF CONTROL OF A HYBRID ELECTRIC VEHICLE

(75) Inventor: Clement Dextreit, Coventry (GB)

(73) Assignee: Jaguar Land Rover Limited (GB)

( * ) Notice: Subject to any disclaimer, the term of this patent is extended or adjusted under 35 U.S.C. 154(b) by 234 days.

(21) Appl. No.: 13/820,624

(22) PCT Filed: Sep. 5, 2011

(86) PCT No.: PCT/EP2011/065260
§ 371 (c)(1),
(2), (4) Date: May 13, 2013

(87) PCT Pub. No.: WO2012/028739
PCT Pub. Date: Mar. 8, 2012

(65) Prior Publication Data
US 2013/0332015 A1 Dec. 12, 2013

(30) Foreign Application Priority Data
Sep. 4, 2010 (GB) .................................. 1014680.1

(51) Int. Cl.
*B60W 20/00* (2006.01)
*B60K 6/448* (2007.10)
(Continued)

(52) U.S. Cl.
CPC ................ *B60W 20/20* (2013.01); *B60K 6/442* (2013.01); *B60K 6/448* (2013.01); *B60K 6/48* (2013.01);
(Continued)

(58) Field of Classification Search
CPC ............ B60K 6/448; B60K 6/52; B60K 6/48; B60K 6/442; B60W 10/06; B60W 10/08; B60W 20/102; B60W 30/182; B60W 30/188; B60W 20/10; B60W 20/20; B60W 2510/0638; B60W 2510/0676; B60W 2510/1005; B60W 2510/244; B60W 2600/00; B60L 2240/441; B60L 2240/445; B60L 2240/486; Y02T 10/56; Y02T 10/6221; Y02T 10/6243; Y02T 10/6265; Y02T 10/6286; Y10S 903/93
USPC .............. 701/22; 180/65.23, 65.262; 903/930
See application file for complete search history.

(56) References Cited

U.S. PATENT DOCUMENTS

7,826,939 B2 * 11/2010 Liu et al. .......................... 701/22
7,988,591 B2 * 8/2011 Heap ................................. 477/3
(Continued)

FOREIGN PATENT DOCUMENTS

EP 2 055 585 A2 5/2009
GB 2 295 128 A 5/1996
(Continued)

*Primary Examiner* — Thomas G Black
*Assistant Examiner* — Ce Li
(74) *Attorney, Agent, or Firm* — Myers Bigel Sibley & Sajovec

(57) ABSTRACT

An illustrative controller for a hybrid electric vehicle has a plurality of actuators each operable independently to provide torque to a driveline of the vehicle. At least one of the actuators is arranged to consume a fuel and at least one other comprises an electric machine. The controller is operable to control the plurality of actuators to apply respective amounts of torque to a driveline of the vehicle according to one of three or more operational modes of the vehicle. The respective amounts of torque are based on a value of each of a first set of two or more operating parameters. The controller is arranged to select two or more of the operational modes based on the first set of operating parameters and a value of a cost functional. A first of the selected modes is the mode having the lowest cost functional according to a control optimization methodology.

32 Claims, 7 Drawing Sheets

(51) Int. Cl.
  *B60K 6/48* (2007.10)
  *B60K 6/52* (2007.10)
  *B60W 10/06* (2006.01)
  *B60W 10/08* (2006.01)
  *B60W 30/182* (2012.01)
  *B60W 30/188* (2012.01)
  *B60K 6/442* (2007.10)

(52) U.S. Cl.
  CPC .............. *B60K 6/52* (2013.01); *B60W 10/06* (2013.01); *B60W 10/08* (2013.01); *B60W 20/10* (2013.01); *B60W 20/102* (2013.01); *B60W 30/182* (2013.01); *B60W 30/188* (2013.01); *B60L 2240/441* (2013.01); *B60L 2240/445* (2013.01); *B60L 2240/486* (2013.01); *B60W 2510/0638* (2013.01); *B60W 2510/0676* (2013.01); *B60W 2510/1005* (2013.01); *B60W 2510/244* (2013.01); *B60W 2600/00* (2013.01); *Y02T 10/56* (2013.01); *Y02T 10/6221* (2013.01); *Y02T 10/6243* (2013.01); *Y02T 10/6265* (2013.01); *Y02T 10/6286* (2013.01); *Y10S 903/93* (2013.01)

(56) References Cited

U.S. PATENT DOCUMENTS

| 8,200,383 | B2* | 6/2012 | Heap | 701/22 |
| 8,346,416 | B2* | 1/2013 | Liu et al. | 701/22 |
| 8,738,203 | B2* | 5/2014 | Liu et al. | 701/22 |
| 2007/0149348 | A1* | 6/2007 | Holmes et al. | 477/3 |
| 2008/0059013 | A1* | 3/2008 | Liu et al. | 701/22 |
| 2008/0119321 | A1* | 5/2008 | Heap | 477/5 |
| 2008/0249695 | A1 | 10/2008 | Matthews | |
| 2009/0069148 | A1* | 3/2009 | Heap | 477/5 |
| 2009/0082170 | A1 | 3/2009 | Heap | |
| 2009/0118884 | A1* | 5/2009 | Heap | 701/22 |
| 2009/0118920 | A1* | 5/2009 | Heap et al. | 701/54 |
| 2009/0145673 | A1* | 6/2009 | Soliman et al. | 180/65.1 |
| 2010/0204863 | A1* | 8/2010 | Sakamoto et al. | 701/22 |
| 2011/0112711 | A1* | 5/2011 | Liu et al. | 701/22 |
| 2011/0130901 | A1* | 6/2011 | Mori et al. | 701/22 |
| 2011/0136608 | A1* | 6/2011 | Kim et al. | 475/127 |

FOREIGN PATENT DOCUMENTS

| GB | 2 338 939 A | 1/2000 | |
| WO | WO 2008131994 A2 * | 11/2008 | |

* cited by examiner

CONTROLLER AND METHOD OF CONTROL OF A HYBRID ELECTRIC VEHICLE

TECHNICAL FIELD

This disclosure relates to hybrid electric vehicles and to a method of controlling a hybrid electric vehicle. In particular but not exclusively this disclosure relates to a controller for a hybrid electric vehicle for controlling a delivery of power from a plurality of power plants to a driveline of the vehicle. Aspects of the disclosed embodiments relate to a controller, to a vehicle and to a method.

BACKGROUND

Hybrid electric vehicles (HEVs) differ from conventional motor vehicles in that they typically employ an electric machine in addition to an internal combustion engine (ICE) in order to provide traction to drive the vehicle. HEVs are also typically equipped with a battery for storing electrical power for powering the electric machine.

In some HEVs the electric machine may also be employed as a generator that is powered by the internal combustion engine in order to generate electrical power to charge the battery.

It will be appreciated that HEVs represent a complex system the control of which is a non-trivial task. Considerable efforts have been made to develop controllers for HEVs that reduce the consumption of fuel by the ICE during the course of a given drive cycle.

SUMMARY

According to one illustrative embodiment, a controller for a hybrid electric vehicle has a plurality of actuators, at least one of the actuators being arranged to consume a fuel and at least one of the actuators comprising an electric machine. The controller is operable to control the plurality of actuators to apply respective amounts of torque to a driveline of the vehicle according to one of three or more operational modes of the vehicle based on a value of each of a first set of two or more operating parameters of the vehicle. The controller is arranged to select two or more of the operational modes based on the first set of operating parameters, the modes being selected responsive to a value of a cost function, a first of the selected modes being the mode having the lowest cost function according to a control optimisation methodology implemented by the controller. The controller is also configured to control the vehicle to assume the first of the selected modes, in the event the first selected mode is unavailable the controller will control the vehicle to assume another of the selected modes.

The operational modes may be referred to as powertrain operational (or operating) modes or powertrain configurations.

Illustrative embodiments may allow the controller to determine which operational mode the vehicle should assume more efficiently. This is because the controller is arranged first to identify a 'list' of two or more operational modes that may be assumed by the vehicle based on values of the first set of two or more operating parameters.

One of these modes is the mode having the lowest cost functional according to the control optimisation methodology implemented by the controller. The controller then determines, from this reduced 'list' which mode should be assumed and controls the vehicle to assume this mode.

This may be useful at least in part because in some situations the vehicle may be arranged not to allow the mode having the lowest cost functional to be assumed. For example, if an 'EV only' mode in which the vehicle is driven only by means of an electric machine is the first of the selected modes but 'EV only' mode is not available, the vehicle must assume another of the selected modes.

The 'EV only' mode may be unavailable at certain times, for example during a prescribed period of time following switching on of the fuel-consuming actuator when the vehicle assumes a parallel mode of operation. This may be so as to reduce a risk of mode chattering, i.e. a situation in which the controller controls the vehicle to switch between EV mode (in which the fuel consuming actuator is switched off) and a parallel mode (in which the fuel consuming actuator is switched on) repeatedly in rapid succession.

In contrast, in prior art arrangements, if a particular optimum torque split is not available, the controller must make a further determination of the optimum operational mode taking this factor into account. That is, the process of determining the optimum torque split must be repeated taking this factor (unavailability of the optimum torque split) into account.

This introduces a delay in the process of determining the optimum torque split that the vehicle can implement and increases the amount of computational processing the controller is required to perform. This is because it must now take non-availability of a mode or of an actuator into account in performing a further determination of the mode having the lowest cost functional.

It is to be understood that a process of determining which mode is the optimum mode may involve a relatively large number of calculations and it is important to reduce the time taken to make this determination so as to improve vehicle efficiency and driver perception of vehicle performance.

It is to be understood that if the controller were arranged to take into account further factors such as availability of an actuator when making the initial selection of two or more modes, the computational burden on the controller might be too high for use in a practical hybrid vehicle.

It is to be understood that the control optimisation methodology implemented by the controller in order to determine the mode having the lowest cost functional may be one of a number of different optimisation methodologies, not being limited to the methodology described herein with respect to disclosed embodiments.

In some embodiments each operational mode corresponds to a different respective torque split between the plurality of actuators, the torque split representing the proportion of the total torque that is to be applied by each actuator.

It is to be understood that in one or mode modes, the torque demanded from one of the actuators may be zero. For example, in an electric vehicle (EV) mode an electric machine may be configured to deliver all of the torque demanded by the driver, the fuel-consuming actuator being configured to deliver no torque, and preferably switched off to reduce fuel consumption and carbon dioxide emissions.

Further, in some embodiments at least one of the operational modes is a mode in which the at least one fuel burning actuator drives an electric machine to generate charge to charge the energy storage means.

The at least one fuel burning actuator may be operable to drive the at least one actuator comprising an electric machine in order to generate charge to charge the energy storage means in addition to applying positive torque to the driveline to drive the vehicle.

In some embodiments, the controller is configured wherein if the first mode is a mode in which the at least one fuel burning actuator is employed, at least one of the selected modes includes the mode in which the at least one fuel burning actuator is not employed that has the lowest cost functional.

This feature may be useful if the mode having the lowest cost functional requires the fuel-burning actuator and this mode is not available for use, for example in order to prevent mode chattering as noted above, the controller may control the vehicle to assume an alternative mode not requiring this actuator, this alternative mode being the mode of lowest cost functional not requiring this actuator.

In some embodiments the controller is arranged wherein if the first mode is a mode in which the at least one fuel burning actuator is employed and one or more modes are allowable responsive to the values of the first set of operating parameters in which the at least one fuel burning actuator is not employed, at least one of the selected modes includes the mode in which the at least one fuel burning actuator is not employed that has the lowest cost functional.

It is to be understood that this mode may be the EV mode, and in some embodiments will be the EV mode. If the EV mode is not available, for example because the battery state of charge is too low and/or the vehicle is unable to generate sufficient torque in EV mode to meet the current driver demand, the controller may force the vehicle to assume the first mode. The fuel burning actuator might therefore need to be restarted.

In some embodiments, the controller is configured wherein if the first mode is a mode in which the at least one fuel burning actuator is not employed, at least one of the selected modes includes the mode having the lowest cost functional in which the at least one fuel burning actuator is employed.

This feature may be useful if the vehicle is unable to switch off the at least one fuel burning actuator, for example in order to prevent mode chattering, the controller may control the vehicle to assume an alternative mode in which the at least one fuel burning actuator is employed. Under these circumstances it may be considered that EV mode with the fuel consuming actuator switched off is unavailable.

The controller therefore selects as the alternative mode the mode having the lowest cost functional in which the at least one fuel burning actuator is switched on. This may avoid wasting energy due to operation of the at least one fuel burning actuator being reduced, in the event this actuator cannot be switched off.

For example, if EV mode has the lowest cost functional of all modes but cannot be assumed for reasons associated with mode chattering, the controller may determine that a parallel recharge mode has the lowest cost functional, in which charging of the energy storage means occurs whilst the fuel-burning actuator is on, rather than a mode in which the vehicle is driven as an electric vehicle with the at least one fuel burning actuator idling, not being connected to the driveline and not being connected to the at least one electric machine to generate charge to recharge the energy storage means.

In some embodiments the controller is arranged wherein if the first mode is a mode in which the at least one fuel burning actuator is not employed, and one or more modes are allowable in which the at least one fuel burning actuator is employed, at least one of the selected modes includes the allowable mode having the lowest cost functional in which the at least one fuel burning actuator is employed.

In some embodiments, the controller is configured to determine the torque split by reference to torque split data stored in a database. The torque split data may be stored in the database in the form of one or more torque split data maps.

Thus, in some embodiments, the controller is not required to provide an implementation of the control optimisation methodology in which all the steps of the methodology are performed online in real time by the controller responsive to the first set of operating parameters. Rather, in some embodiments the controller implements the control methodology by applying the first set of operating parameters as inputs to a database. Responsive to these inputs the database outputs data in respect of the identity of the selected modes as they would have been determined if the controller was performing the steps of the optimisation methodology online.

In some embodiments the controller is not required to perform calculations to implement the control optimisation methodology online, i.e. in real time. Rather, the controller may refer to stored values determined offline according to the chosen control optimisation methodology. Thus the data maps may be data maps generated offline according to the control optimisation methodology.

In some embodiments the cost functional is responsive to at least one selected from amongst a rate of fuel consumption of the vehicle, a rate of emission of a gas by the vehicle, an amount of noise generated by the vehicle, a deviation of a state parameter from a prescribed value and a rate of emission of one or more types of particulate material.

The state parameter may be a state of charge of the energy storage means.

In some embodiments the cost functional is responsive to a rate of fuel consumption of the vehicle, a rate of emission of a gas by the vehicle and a deviation of a state parameter from a prescribed value, the controller being operable to determine a required operational mode according to a feedback Stackelberg equilibrium control optimisation methodology.

In some embodiments the state parameter corresponds to a value of a state of charge of the energy storage means.

Optionally the controller is arranged to discretise values of the first set of two or more operating parameters to values corresponding to those of data stored in the one or more data maps.

Thus the controller does not perform an interpolation operation to determine the selected two or more modes when the values do not correspond precisely to database data coordinates. Rather, the controller converts the values of the first set of parameters to values for which data is stored in the database, the controller employing the selected two or more modes stored in the database that corresponding to those values.

By discretise it is meant, for example, that the controller converts input values of a parameter into values that correspond to a coordinate of data in the database (which may be stored in the form of one or more maps). For example, the controller may be configured to round the value of each of the operating parameters to the nearest coordinate of data stored in a map of the database. Thus if the actual value of torque demanded by the driver is 76 Nm but the closest data stored in the map correspond to values of driver demanded torque of 70 Nm and 80 Nm, the controller may be configured to discretise the actual driver demanded torque of 76 Nm to a value of 80 Nm, being the data value having a torque coordinate that is closest to the actual value or torque.

Optionally the controller is arranged to determine the required operational mode of the vehicle from the selected two or more modes responsive to non-discretised values of one or more of the first set of two or more operating parameters.

In some embodiments the required operational mode of the two or more selected modes may be determined responsive to more precise data in respect of values of the first set of two or more operating parameters.

The controller may be arranged to determine the required operational mode from the selected two or more modes and to output the required mode to a torque demand module, the torque demand module being arranged to determine a value of torque to be demanded from each of the plurality of actuators based on the required operational mode, a value of one or more of the first set of two or more operating parameters and data in respect of one or more system state parameters of the vehicle, the torque demand module being configured to demand a required amount of torque from the actuators responsive to the values of the one or more system state parameters.

Thus if the one or more system state parameters have values responsive to which the controller cannot demand a certain level of torque from (say) the actuator comprising an electric machine, the controller may control the fuel consuming actuator to deliver a larger amount of torque thereby to meet driver demand for torque.

The one or more system state parameters may include for example a charge or discharge limit of the energy storage means, the charge of discharge limit being responsive to temperature of the energy storage means and optionally one or more further parameters such as state of charge. Other arrangements are also useful.

In some embodiments one of the at least one fuel consuming actuators comprises an internal combustion engine.

Optionally one of the actuators comprises an electric motor operable to apply a positive torque to the driveline.

Further optionally one of the actuators comprises an electric generator operable to apply a negative torque to the driveline.

In some embodiments the actuator comprising an electric machine comprises an electric machine operable to apply either a positive or a negative torque to the driveline as required.

Thus the electric machine is operable as a motor or as a generator.

In some embodiments the first set of two more operating parameters include at least one selected from amongst a speed of rotation of a portion of the driveline, a torque present at a portion of the driveline being a value of torque demanded by a driver of the vehicle at that portion, a battery state of charge, an engine temperature, an engine coolant temperature, an exhaust gas temperature, a state of a gearbox of the vehicle being a gear ratio of the gearbox.

The driveline torque may correspond to a driver demanded value of driveline torque. The driveline speed may correspond to a driver demanded driveline speed.

The driveline torque may correspond to a crankshaft torque and the driveline speed may correspond to a crankshaft speed. Alternatively the driveline torque and driveline speed may be a torque and speed (for example driver demanded torque and speed) at any other suitable location of the driveline such as a gearbox output shaft, a driveshaft, a wheel or any other suitable location of the driveline.

In some embodiments the first set of two more operating parameters comprises a driveline torque, a driveline speed and a state of charge of the energy storage means.

In some embodiments the first set of two more operating parameters further comprises a temperature of the at least one fuel burning actuator.

Alternatively or in addition the first set of two or more operating parameters further comprises a state of a gearbox of the vehicle being a gear ratio of the gearbox.

The actuators of the vehicle may comprise at least one selected from amongst an internal combustion engine, an electric motor, an electric generator, a motor/generator and an electric rear axle drive (ERAD).

According to an illustrative method of controlling a hybrid electric vehicle having a plurality of actuators each operable to provide torque to a driveline of the vehicle, at least one of the actuators being arranged to consume a fuel and at least one of the actuators comprising an electric machine operable to be powered by energy storage means, of the method includes:
  receiving at a controller a value of each of a first set of two or more operating parameters of the vehicle;
  selecting two or more operational modes of the vehicle from a set of three of more operational modes responsive to the first set of operating parameters, each mode corresponding to a prescribed configuration of respective amounts of torque applied to the driveline by the plurality of actuators,
  the method comprising selecting the two or more modes responsive to a value of a cost functional, a first of the selected modes being the mode having the lowest cost functional according to a control optimisation methodology implemented by the controller,
  the method further comprising controlling the vehicle to assume the first of the selected modes, in the event the first selected mode is unavailable the method comprising controlling the vehicle to assume another of the two or more selected modes.

Advantageously if the first mode is a mode in which the at least one fuel burning actuator is employed, the step of selecting two or more modes comprises selecting the mode in which the at least one fuel burning actuator is not employed that has the lowest cost functional.

In some embodiments if the first mode is a mode in which the at least one fuel burning actuator is not employed, the step of selecting two or more modes comprises selecting the mode having the lowest cost functional in which the at least one fuel burning actuator is employed.

In some embodiments the step of selecting the two or more modes responsive to the value of the cost functional comprises the step of accessing a database in which the two or more modes corresponding to respective combinations of values of each of the first set of operating parameters are stored.

Optionally the step of accessing the database comprises inputting to the database the value of each of the first set of operating parameters.

In some embodiments the method further comprises the step of generating the identity of the selected two or more modes for each respective combination of values of each of the first set of operating parameters offline according to the control optimisation methodology.

The method may comprise the step of discretising values of the first set of two or more operating parameters to values corresponding to coordinates of data stored in the database.

In some embodiments the cost functional is responsive to at least one selected from amongst a rate of fuel consumption of the vehicle, a rate of emission of a gas by the vehicle, an amount of noise generated by the vehicle and a deviation of a value of a state parameter from a prescribed value.

In some embodiments the cost functional is responsive to the deviation of the value of the state parameter from a prescribed value, the state parameter corresponding to a state of charge of the energy storage means.

In some embodiments the cost functional is responsive to a rate of fuel consumption of the vehicle, a rate of emission of a gas by the vehicle and a deviation of a state of charge of the energy storage means from a prescribed value, the method comprising determining a required operational mode of the vehicle according to a feedback Stackelberg equilibrium control optimisation methodology.

According to an illustrative embodiment there is provided a controller for a hybrid electric vehicle having a plurality of actuators each operable to provide torque to drive the vehicle, at least one of the actuators being arranged to consume a fuel, at least one of the actuators comprising an electric machine operable to be powered by energy storage means, the controller being operable to determine a required torque split between the plurality of actuators responsive to a first set of two or more operating parameters of the vehicle, the torque split being a proportion of the total torque that is to be provided to the driveline by each actuator, the torque split being determined by reference to one or more stored torque split data maps.

Embodiments of the invention allow for the torque to be determined directly by reference to one or more stored torque split maps the controller does not have to calculate the required torque split according to an algorithm in real time. Rather, the torque for a range of values of the first set of two or more operating parameters of the vehicle may be optimised by calculations performed offline (i.e. not by the controller in real time in direct response to current values of the one or more operating parameters) and stored in a memory in the form of one or more data maps. The calculations may therefore be relatively complex calculations which could not be performed in real time by the controller at a rate sufficiently high to be useful in a hybrid vehicle.

A required torque split between actuators can therefore be determined by the controller for a given set of vehicle operating parameters by reference (this time in real time) to the one or more stored maps. Embodiments of the invention therefore have the advantage that a computational burden on the controller may be reduced since the controller is able to obtain the value of required torque split from a memory without performing sophisticated calculations.

By torque split data map is meant a data map from which the controller may determine the required torque split between the plurality of actuators by inputting values of each one of the first set of operating parameters. These parameters are referred to as a first set of operating parameters since other operating parameters may be used by the controller in the course of vehicle control, for example to determine whether the determined torque split is an allowable torque split in light of the value of one or more other vehicle parameters not being members of the first set. In some arrangements it is advantageous that the first set of operating parameters contains as few members as possible in order to reduce a computational and data storage overhead on the controller in accessing a data-map responsive to values of more parameters.

In some embodiments the data map may be arranged to store the value of torque to be provided by one of the actuators (such as an electric machine), the controller being arranged to calculate the amount of torque that must be provided by another actuator (such as the at least one fuel consuming actuator) by calculating a difference between the amount of torque demanded by the driver and the amount that is to be provided by said one actuator according to the data map. Thus, the controller is able to determine the required torque split by reference to the data map even though the data map does not explicitly contain the value of torque to be delivered by each actuator. This feature allows a reduction in an amount of data required to be stored by the controller or associated storage device without compromising vehicle control.

In the event that no torque is to be provided by one of the actuators, allowing that actuator to be switched off, the data map may be arranged to provide an indication that that actuator can be switched off.

In some embodiments, instead of data corresponding directly to a torque split the data map may store data in respect of a required rate of flow of air (or other combustion gas) into the fuel consuming actuator and/or rate of flow of fuel into the engine. The particular parameter stored may depend on the type of fuel consumed by the actuator, for example whether petrol or diesel is consumed, i.e. whether the actuator is an engine of spark ignition type such as a petrol burning engine or a diesel engine. Data may also be stored in respect of a required flow of current through the at least one electric machine in addition to or instead of in respect of a torque value.

Alternatively, the data may be data that does correspond directly to a required torque split, the vehicle being configured to control the plurality of actuators to deliver respective torque values responsive to the torque split data. Other control means may therefore determine required values of current for the at least one electric machine, and fuel or air flow rates or any other required data for the at least one fuel consuming actuator.

The data maps may comprise data maps generated offline according to an optimisation algorithm arranged to optimise the required torque split to reduce a value of one or more performance parameters of the vehicle being parameters indicative of a performance of the vehicle, for example, to reduce a cost functional associated with one or more parameters of the vehicle.

The one or more performance parameters may correspond to at least one selected from amongst a rate of fuel consumption of the vehicle, a rate of emission of a gas by the vehicle, a deviation from a nominal state of charge of a state of charge of an energy storage device arranged to power one or more of the plurality of actuators and a noise level generated by the vehicle.

In some embodiments the controller is arranged to discretise values of each of the first set of operating parameters to values corresponding to coordinates of data stored in the one or more data maps, and to input these discretised values to the one or more data maps thereby to access data stored therein.

The one or more stored data maps may be arranged to store data corresponding to a list of operational modes of the vehicle ranked according to a cost functional of the vehicle for a given set of discrete values of the first set of plurality of operating parameters.

At least a plurality of the operational modes may correspond to different respective torque splits between the plurality of actuators.

The controller may be arranged to provide the data corresponding to the list of operational modes to a mode arbitrator arranged to determine a required operational mode of the vehicle based on the data corresponding to the list of operational modes and non-discretised values of the first set of operating parameters.

By non-discretised is meant values of the parameters prior to discretisation by the controller.

The controller may be further arranged to provide the required operational mode of the vehicle determined by the mode arbitrator to a torque demand module, the torque demand module being arranged to determine values of torque to be demanded from each of the plurality of actuators based on the required operational mode and non-discretised values of one or more of the first set of operating parameters.

Alternatively or in addition the controller may be arranged to output a signal indicative of at least one selected from amongst a required gear to be engaged by a gearbox, an amount of exhaust gas to be recirculated by an exhaust gas recirculation (EGR) system and an amount of purge vapour to be transferred from an evaporative emission trap to an intake system of the vehicle.

In some embodiments the at least one data map is a data map generated according to a non-cooperative game theory with Stakelberg equilibrium model.

One of the at least one actuators arranged to consume a fuel may comprise an internal combustion engine.

At least one said at least one electric machine may comprise an electric motor arranged to apply a positive torque to the driveline.

The vehicle may comprise an electric generator arranged to apply a negative torque to the driveline.

At least one said at least one electric machine may comprise a motor/generator arranged to apply a positive or negative torque to the driveline as required.

For example the motor/generator may be a crankshaft-integrated motor generator, a crankshaft integrated starter/generator, a belt-integrated starter/generator or any other suitable device.

The first set of operational parameters may include at least one selected from among a driveline speed, a driveline torque being a value of driveline torque demanded by a driver of the vehicle, a battery state of charge, an engine temperature such as an engine coolant temperature and/or an exhaust gas temperature and a state of a gearbox of the vehicle being a gear ratio of the gearbox.

The driveline speed and/or torque may be a speed and/or torque at any suitable location of the driveline such as a crankshaft speed and/or torque, a gearbox input or output shaft speed and/or torque or a wheel speed and/or torque.

Alternatively or in addition the operational parameters may include a crankshaft speed, a crankshaft torque being a value of crankshaft torque demanded by a driver of the vehicle, a battery state of charge and an engine temperature.

Alternatively or in addition the operational parameters may include a wheel torque, a wheel speed, a battery state of charge and a state of a gearbox of the vehicle being an identity of an engaged gear.

According to an illustrative embodiment there is provided a method of controlling a hybrid electric vehicle having a plurality of actuators each operable to provide torque to a driveline of the vehicle, at least one of the actuators being arranged to consume a fuel, comprising the steps of:
receiving at a controller data corresponding to a plurality of operating parameters of the vehicle;
determining by means of the controller a required torque split between the plurality of actuators responsive to the received data, the torque split being a proportion of the total torque that is to be provided to the driveline by each actuator, the torque split being determined by reference to one or more stored torque split data maps; and
controlling the plurality of actuators to deliver the torque to the driveline according to the required torque split.

In some embodiments there is provided a controller for a hybrid electric vehicle having a plurality of actuators each operable to apply a torque to a driveline of the vehicle, at least one of the actuators being arranged to consume a fuel,
the controller being operable to determine a required torque to be supplied by at least one of the plurality of actuators responsive to a plurality of operating parameters of the vehicle, the required torque being determined by reference to one or more stored data maps.

In some embodiments there is provided a method of controlling a hybrid electric vehicle having a plurality of actuators each operable to provide torque to a driveline of the vehicle, at least one of the actuators being arranged to consume a fuel, comprising the steps of:
receiving data corresponding to a plurality of operating parameters of the vehicle; and
determining a required torque to be supplied by at least one of the plurality of actuators responsive to a plurality of operating parameters of the vehicle, the required torque being determined by reference to one or more stored data maps.

Within the scope of this application it is envisaged that the various aspects, embodiments, examples, features and alternatives set out in the preceding paragraphs, in the claims and/or in the following description and drawings may be taken independently or in any combination thereof. For example, features described with reference to one embodiment are applicable to all embodiments, except where there is incompatibility of features.

BRIEF DESCRIPTION OF THE DRAWINGS

Embodiments of the invention will now be described, by way of example only, with reference to the accompanying figures in which.

DETAILED DESCRIPTION

Figure 1:
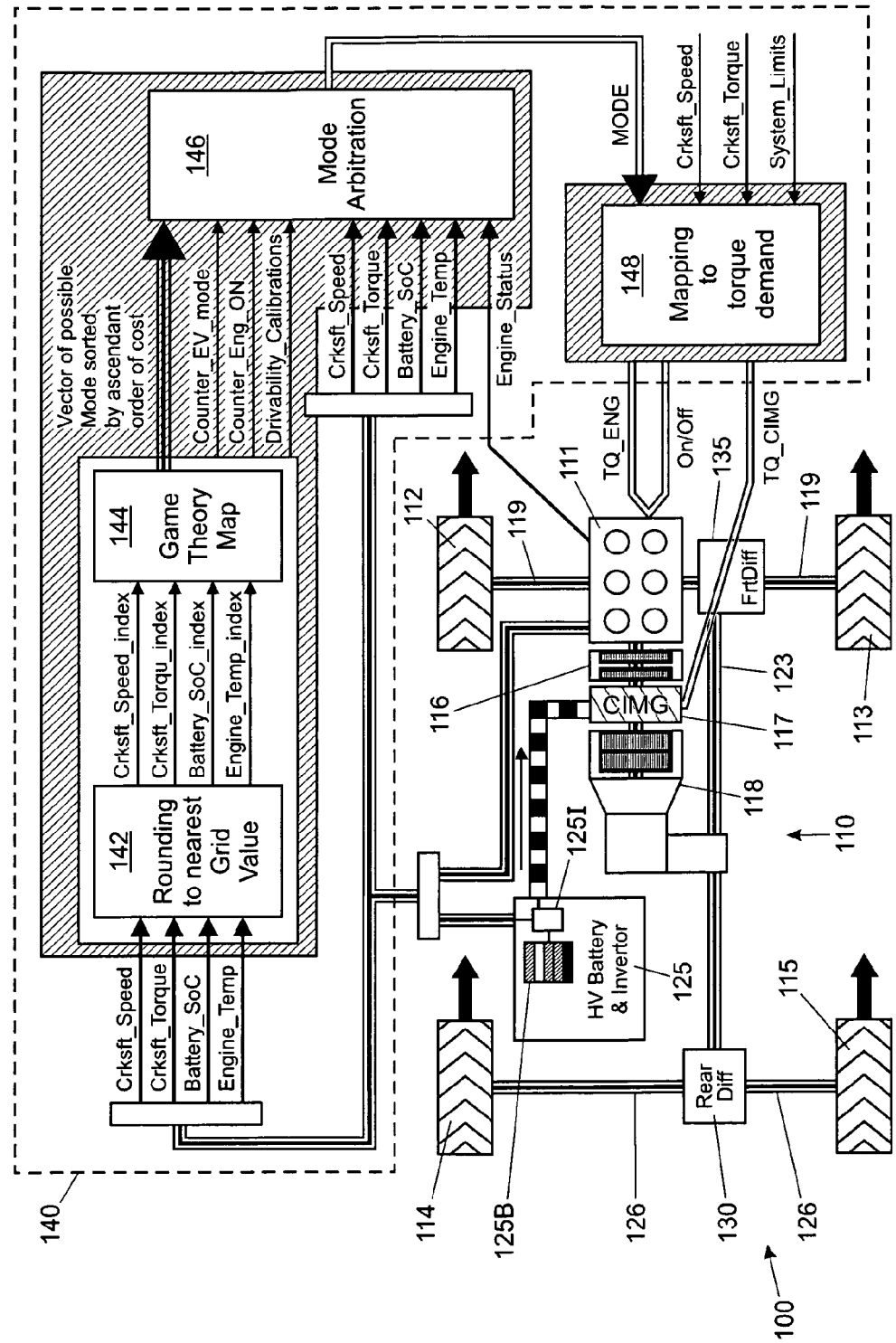
FIG. 1 is a schematic illustration of a hybrid electric vehicle according to an embodiment of the present invention.

FIG. 1 is a schematic illustration of a hybrid vehicle 100 according to an embodiment of the present invention. The vehicle has an internal combustion engine (ICE) 111, a crankshaft integrated motor generator (CIMG) 117 and a transmission 118. The CIMG 117 is releasably connectable to the ICE 111 by means of a clutch 116. Clutch 116 may also be referred to as clutch $K_0$ 116.

The CIMG 117 is coupled to a power supply module 125 having an inverter 125I and a battery 125B. The power supply module 125 is arranged to provide a source of power to the CIMG 117 when it is required to use the CIMG 117 as an electric motor. The power supply module 125 is also operable to charge the battery 125b when the CIMG 117 is being used as an electric generator. The CIMG 117 may be used as an electric generator when the clutch $K_0$ 116 is closed and the ICE 111 is running.

The transmission 118 is operable to connect the CIMG 117 and the ICE 111 to a driveshaft 123 of the vehicle. The driveshaft 123 is part of a driveline 110 of the vehicle. When clutch 116 is open the CIMG 117 may be used to apply a torque to the driveshaft 123.

The driveline 110 also includes a front differential 135 arranged to couple the driveshaft 123 to each one of a pair of front drive shafts 119 and a rear differential 130 arranged to couple the driveshaft 123 to each one of a pair of rear drive shafts 126. The front drive shafts 119 drive a pair of front wheels 112, 113 whilst the rear drive shafts 126 drive a pair of rear wheels 114, 115.

The vehicle is operable to provide torque to the driveshaft 123 by means of the CIMG 117 and the ICE 111 either separately or simultaneously. Thus three primary modes of operation of the vehicle 100 may be identified.

In a first mode of operation, known as a parallel recharge mode, the ICE 111 is employed to provide torque to the driveline 110 and the CIMG 117 is used as a generator to recharge the battery 125B. Thus, the CIMG 117 is arranged to apply a negative torque to the driveline 110. This first primary mode corresponds to operational modes 4 to 7 of the vehicle 100 as shown in Table 1. Each of these modes corresponds to a different amount of negative torque applied by the CIMG 117 to the ICE 111 in order to generate charge torecharge the battery 125B.

In a second mode of operation, known as a parallel boost mode, the ICE 111 and the CIMG 117 are both used to provide torque to the driveline 110, the CIMG 117 drawing power from the power supply module 125 in order to provide positive torque to the driveline 110 in addition to that provided by the ICE 111. This second primary mode corresponds to operational modes 8 to 11 of the vehicle 100 as shown in Table 1. Each of these modes corresponds to a different amount of positive torque applied by the CIMG 117 to the ICE 111 in order to boost the amount of torque applied to the driveline 110 to drive the vehicle 100.

In a third mode of operation known as an electric vehicle (EV) mode the ICE 111 is disconnected from the CIMG 117 by opening the clutch $K_0$ 116. The CIMG 117 alone is employed to provide torque to the driveline 110. The ICE 111 may be switched off in EV mode. This third primary mode corresponds to mode 1 of the vehicle as shown in Table 1.

It is to be understood that the vehicle 100 shown in FIG. 1 is a parallel hybrid vehicle (rather than a series hybrid vehicle). In a series hybrid vehicle the ICE 111 is operable to provide torque to a generator in order to generate electric power which is then either stored in a battery (or other storage device) or used directly to power an electric motor to provide torque to the wheels. It is to be understood that some embodiments of the invention may be employed to control series hybrid vehicles or parallel-series hybrids being hybrid vehicles operable in a series or parallel mode.

The vehicle 100 has a controller 140 arranged to provide control signals to a controller of the ICE 111 and to a controller of the CIMG 117 in respect of how much torque the ICE 111 and CIMG 117 are each required to supply to the driveline 110. These signals may be referred to as an ICE-demanded torque value, TQ_ENG (or TQ_ICE), and a CIMG-demanded torque value, TQ_CIMG, respectively.

The controller 140 also provides a control signal to the ICE 111 to turn the ICE 111 on and off as required.

It is to be understood that in some embodiments when the CIMG 117 is required to act as a provider of torque to the driveline 110 the controller 140 is arranged to output a positive value of demanded torque to a controller of the CIMG 117. When the CIMG 117 is required to act as a generator of electricity the controller 140 is arranged to output a negative value of demanded torque to the CIMG controller.

This is because when running as a generator the CIMG 117 acts to apply a negative torque to the ICE 111 thereby to draw power from the ICE 111 to generate electricity as described above.

It is to be understood that the controller 140 is required to control the ICE 111 and CIMG 117 so as to optimise a performance of the vehicle 100 and to provide fuel efficient operation. Thus, in some embodiments the controller 140 seeks to maintain a state of charge (SoC) of the battery 125B at a level allowing operation of the vehicle in EV mode as much as possible when vehicle operating parameters permit. For example, in some arrangements EV mode may be assumed when the battery SoC is sufficiently high and the value of driver demanded torque is sufficiently low, at relatively low speeds so as not to drain the battery too quickly. Other vehicle operating parameters may also be relevant to the determination whether the vehicle may be operated in EV mode.

In the embodiment shown the controller 140 is arranged to receive signals corresponding to each of four operational parameters of the vehicle, which may be referred to as a first set of parameters: (i) a value of the speed of the crankshaft of the vehicle (Crksft_Speed), (ii) a value of a crankshaft torque demanded by a driver (Crksft_Torque), (iii) a battery SoC (Battery_SoC) and (iv) an engine temperature (Engine_Temp).

In some embodiments, instead of a crankshaft torque or crankshaft speed, a value of torque and a speed of rotation at another position of the powertrain may be employed. It is to be understood that reference to a crankshaft torque and a crankshaft speed may include reference to a gearbox input torque and a gearbox input speed, respectively, in some embodiments.

These signals are input to both a discretiser module 142 and a mode arbitrator module 146 of the controller 140. It is to be understood that in some embodiments signals corresponding to other operational parameters may be used instead of or in addition to the above four parameters.

The discretiser module 142 is arranged to discretise the values of the operational parameters provided thereto, i.e. to round the values to a nearest discretiser module grid value or index value. The grid values correspond to values of the parameters that were provided as inputs to an optimisation algorithm arranged to determine optimum values of demanded torque from the ICE 111 and CIMG 117 for the given set of input values.

The discretiser module 142 is arranged to output four index values corresponding to the values of the four operational parameters input, being a crankshaft speed index value (Crksft_Speed_index), a demanded crankshaft torque index value (Crksft_Torque_index), a battery SoC index value (Battery_SoC_index) and an engine temperature index value (Engine_Temp_index) to a map module 144.

It is to be understood that discrete values of the operational parameters are used in order to reduce an amount of data that must be stored in a memory of the map module 144 as described below. It is to be understood that the greater the number of index values for a given range of values of a given parameter the greater the amount of memory required for the map module 144 in order to store the index values and the corresponding map values.

The map module 144 is arranged to provide an output to the mode arbitrator 146 in the form of a vector of possible operating or 'operational' modes of the vehicle 100 ranked according to cost. By vector of possible modes is meant that the output includes a list of possible modes, for example a sequence of identifiers corresponding to each possible mode, ranked according to cost. In the arrangement of FIG. 1 the map module 144 outputs two possible modes. One is the mode of lowest cost functional, the second is a mode of higher cost functional but which is an alternative mode that the vehicle may assume as will be discussed in more detail below.

In some alternative embodiments the map module 144 provides an output of an identifier of one of a plurality of lists of possible operating modes stored in a memory of the mode arbitrator 146. This has the advantage that the amount of data required to be output by the map module 144 may in some embodiments be reduced still further.

As discussed below, the vector of possible modes ranked according to cost are determined offline for a given set of values of vehicle operating parameters by an application of an optimisation algorithm. In the present embodiment the algorithm is an algorithm arranged to determine a lowest cost functional configuration according to game theory in which the first set of vehicle operating parameters (or 'conditions') (e.g. crankshaft speed and crankshaft torque) and the powertrain are viewed as two players in a finite horizon zero sum game.

A cost functional of the game weights fuel consumption, emissions, a deviation of the battery SoC from a set-point and a deviation of values of certain vehicle operating parameters from reference values of the operating parameters. A penalty is applied in the game in respect of operation of the vehicle at selected pre-defined operating conditions as a Stackelberg feedback from the previous state of the game, for successive states. These pre-defined operating conditions correspond to conditions commonly encountered in the course of a drive cycle which the vehicle will commonly perform. Thus the controller 140 may be optimised for 'everyday' driving, i.e. the operating conditions that are to be expected most often. Other arrangements are also useful.

In the present embodiment the pre-defined operating conditions correspond to values of crankshaft torque, crankshaft speed, battery SoC and engine coolant temperature.

It is to be understood that other factors may be useful in addition to or instead of the above in respect of the cost functional.

Thus it is to be understood that a control policy for determining for example an amount of power to be drawn from the ICE 111 to charge the battery can be determined as a feedback Stackelberg equilibrium of the game as a function of crankshaft torque, crankshaft speed, battery SoC and engine coolant temperature.

It is to be understood that fuel consumption may be linked to financial cost (the cost of fuel) and other costs such as an environmental cost. Thus the greater financial costs associated with higher levels of fuel consumption may also impact directly on the environmental costs associated with operation of the vehicle such as an amount of combustion gases output by the vehicle (e.g. $CO_2$, NO etc).

The mode arbitrator 146 is arranged to determine which one of the possible modes of operation that have been determined by the mapping module 142 to be possible modes should be assumed, and provides an output to a torque demand module 148 corresponding to the required mode. The torque demand module 148 determines a required value of torque to be demanded from the ICE 111 and CIMG 117 respectively. The mode arbitrator 146 also provides an output to the torque demand module 148 to control the operational state of the ICE 111.

For example, if a transition from EV to parallel mode is required the mode arbitrator 146 signals to the torque demand module 148 that it is required to start the ICE 111. The signal from the mode arbitrator 146 may also be sent to one or more other modules or devices, such as a vehicle systems controller.

The mode arbitrator 146 has a series of counters that measure how long the ICE 111 has been in a given operational state since it last assumed that operational state. The mode arbitrator 146 also stores calibration constants that are used by the controller 140 to reduce a risk of mode chattering. That is, a risk that the vehicle 140 will transition back and forth in an unacceptably rapid succession between modes, such as between respective parallel modes and/or between a parallel mode and EV mode. Thus the counters may be employed to ensure that the ICE 111 does not change state (i.e. it is not switched on or off) before a given time period has elapsed since it last changed state. Optionally in some embodiments the state may still be changed if one or more other conditions are met. For example, if the controller 140 controls the vehicle 100 to assume the EV mode the mode arbitrator 146 is arranged to prevent the engine 111 from being switched on until a prescribed time period has elapsed, the time period being a function of vehicle speed. The time period may be lower at higher vehicle speeds. This is at least in part because it is typically globally sub-optimum to operate in EV mode at higher vehicle speeds due to relatively rapid discharge of the battery, requiring later recharging of the battery where conditions for recharging may not be optimal. Furthermore, at higher speeds NVH (noise, vibration and harshness) associated with engine starting and stopping is less noticeable to the driver and therefore more frequent stopping and starting of the engine is less of an issue.

However, in some embodiments if whilst in EV mode the driver demands an amount of torque that cannot be met by the CIMG 117 alone the controller 140 controls the engine 111 to start in order to meet the driver demand regardless of how recently the engine 111 was switched off.

Mode chattering is undesirable since it may lead to reduced drivability of a vehicle and/or a deterioration in noise, vibration and harshness (NVH) performance. Mode chattering also typically results in an increase in an amount of undesirable emissions such as $CO_2$ and $NO_x$.

The mode arbitrator 146 is arranged to enhance drivability of the vehicle 100 by seeking to meet the following requirements: i) controlling the vehicle to spend as little time as possible in a parallel mode whilst the driver is demanding a certain level of positive crankshaft torque; ii) controlling the vehicle to spend as much time as possible in EV mode as long as the battery SoC is within a particular range and the CIMG 117 can produce the driver demanded torque; iii) switching the engine off a calibrated time period after throttle lift off or a braking event, the time period being a function of crankshaft speed in some embodiments; and iv) starting the engine when the battery SoC falls below a prescribed level.

As noted above the mode arbitrator 146 is also arranged to receive an input of the four operating parameters that are provided to the discretiser module 142, i.e. the mode arbitrator 146 receives non-discretised values. This is because the mode arbitrator 146 typically requires more precise values of the four operating parameters than the discretised values provided to the map module 144 in order for it to determine an optimum mode of operation.

As described above, the map module 144 outputs two possible modes selected by it—the mode of lowest cost functional (first selected mode) and a mode of higher cost functional but which is an alternative mode that the vehicle may assume (second selected mode).

In the arrangement of the present embodiment, the second of the possible modes is selected responsive to the first mode. If the first mode is a mode in which the ICE 111 is switched off (EV mode, mode 1 in Table 1) the map module 144 is arranged to output as the second mode the mode of lowest cost functional in which the ICE 111 is switched on. Thus, if the vehicle 100 is unable to assume EV mode, the mode arbitrator 146 controls the vehicle 100 to assume this second mode.

If the first mode is a mode in which the engine 111 is on, for example a parallel boost mode, the second mode will be the EV mode unless the map module 144 has determined that the EV mode is not available for the current values of the four operating parameters input to it. If the EV mode is not available, then the map module 144 outputs as the second mode the mode of next lowest cost functional after the first mode.

Other arrangements are also useful for selecting the second mode.

For the avoidance of doubt it is stated that in the present embodiment the map module 144 outputs data indicating the identity of the first and second modes which are determined offline according to the optimisation methodology described herein. The modes are determined offline in order to reduce an amount of processing that is required to be performed in real time during vehicle operation.

In the present embodiment the mode arbitrator 146 is configured to determine whether the first selected mode output by the map module 144 is a mode that the vehicle 100 may assume according to a set of prescribed criteria requiring reference to data which includes data other than values of the first set of parameters. The mode arbitrator 146 is arranged to cause the controller 140 to control the vehicle 100 to assume the second mode if the first mode is not available according to the prescribed criteria.

According to the criteria, the mode arbitrator 146 is configured to over-ride assumption of the first mode if:

1. the first mode is the EV mode (mode 1) and the ICE 111 was switched on within a prescribed time period of the current time, i.e. the time at which the EV mode was selected as the first mode; this prescribed time period may be responsive to a speed of the vehicle, e.g. it may decrease as a function of increasing vehicle speed;

2, the first mode is a mode in which the ICE 111 is required to be switched on and the ICE was switched off within a prescribed time period of the current time;

3. the first mode is a parallel recharge mode (one of modes 4 to 7 of table 1) and the vehicle speed is below a prescribed speed (this is so as to reduce NVH at low vehicle speeds);

4. the first mode is the EV mode, the current mode is a mode in which the ICE 111 is on and the selection of EV mode as the first mode has occurred within a prescribed time period of the driver releasing the accelerator (or throttle) pedal without depressing the brake (this feature reduces a delay in delivering drive torque from the ICE 111 in the event the driver re-depresses the accelerator pedal, for example in a driver 'change of mind' scenario);

5. the first mode is a mode in which the ICE 111 is required to be switched on but the vehicle is currently creeping below a prescribed speed in EV mode (this is in order to reduce NVH due to mode chattering when the vehicle is travelling at low speed; the vehicle 100 may for example be latched in EV mode for a prescribed period of time to accomplish this);

6. the first mode is the EV mode but the battery SoC is below a prescribed value requiring recharging of the battery 125B, for example to prevent damage to the battery 125B; and 7. the first mode is the EV mode but the mode arbitrator 146 has determined that the driver has requested an amount of torque that cannot be delivered whilst in EV mode but which the Crkshft_Torque signal input to the map module 144 (being a low-pass filtered signal) does not yet reflect. The mode arbitrator 146 has as an input the unfiltered Crkshft_Torque signal and is therefore able to predict from this value a future value of Crkshft_Torque signal that will be input to the map module 144 (i.e. predict the filtered value). If the driver has suddenly increased the amount of torque demanded, the mode arbitrator 146 may therefore be able to predict that the map module 144 may imminently select as the first mode a parallel boost mode (i.e. one of modes 4 to 7 of table 1) in which the ICE 111 is required to be switched on. Thus the mode arbitrator 146 selects the second mode, being a mode in which the ICE 111 is required to be switched on.

As noted above the torque demand module 148 receives an input from the mode arbitrator 146 of the required mode of operation of the vehicle, i.e. whether the vehicle is to operate in parallel recharge mode, parallel boost mode or electric vehicle mode and, if operating in a parallel mode, the level of torque to demanded from the CIMG 117.

For a given mode of operation as determined by the mode arbitrator 146 the torque demand module 148 is arranged to determine the value of torque to be demanded from the ICE 111 and CIMG 117 as well as the operational state of the ICE 111 based on the values of Crkshft_Speed, Crksft_Torque and a parameter System_Limits.

The parameter System_Limits provides an indication of the limits of selected operating parameters in respect of the vehicle 100. Based on this parameter the torque demand module 148 is arranged to provide values of demanded torque to the ICE 111 and CIMG 117 that respect the limits of the selected operating parameters. In other words, the torque demand module 148 provides values of demanded torque that are intended not to cause the vehicle to exceed the limits of operating parameters indicated by the parameter System_Limits.

For example, the parameter System_Limits may include data in respect of charge/discharge limits of the power supply module 125 which data is determined taking into account the current state of charge of the battery 125B, battery temperature and ICE temperature. For example, if the battery SoC is relatively low, the battery voltage may be lower than that when the battery SoC is relatively high, requiring increased current drain for a given power demand.

In some embodiments the parameter System_Limits may include in addition or instead values of a minimum and a maximum allowable battery SoC, a maximum engine operating temperature, a maximum CIMG 117 operating temperature and maximum and/or minimum values of one or more other parameters.

If the values of torque to be demanded from the ICE 111 and CIMG 117 according to the required mode of operation may be met without exceeding limits of operation of the vehicle 100 the module 148 controls the ICE 111 and CIMG 117 to deliver the required torque values.

Thus, if EV mode is selected by the mode arbitrator 146 the torque demand module 148 provides a signal for the CIMG 117 to provide the demanded crankshaft torque (Crksft_Torque), within system limits.

If the mode arbitrator 146 has selected a parallel mode of operation (one of modes 4 to 11 of Table 1) the torque demand module 148 determines the torque to be provided by the ICE 111 based on the value of CIMG torque specified by the mapping module 144 such that a sum of the provided torques is equal to the driver-demanded crankshaft torque (Crksft_Torque), again within system limits. The torque demand module then provides a control signal to cause the ICE 111 and CIMG 117 to provide their respective values of torque.

Thus, in the case of a parallel recharge mode of operation (one of modes 4 to 7 of Table 1) the torque demand module 148 generates a target negative torque for the CIMG 117 and a target positive torque for the ICE 111 such that the sum of the torque demanded from the ICE 111 and the torque demanded from the CIMG 117 is equal to the demanded crankshaft torque.

In the case of a parallel boost mode of operation (one of modes 8 to 11 of Table 1) the torque demand module 148 generates a target positive torque for the CIMG 117 and a target positive torque for the ICE 111 such that the sum of the torque demanded from the ICE 111 and the torque demanded from the CIMG 117 is again equal to the demanded crankshaft torque.

It is to be understood that in the present embodiment, optimisation of the torque demanded of the CIMG 117 in order to generate maps for the map module 144 was performed offline in an application of game theory. Unlike conventional dynamic programming solutions, game theory-based solutions are time and drive cycle independent. They also compare favourably with stochastic dynamic programming in terms of computations, as the value function depends on fewer variables.

In some embodiments the controller 140 is arranged to control the vehicle 100 to reduce NOx emissions in addition to reducing fuel consumption. It is to be understood that NOx emissions are of particular concern in the operation of diesel-type internal combustion engines.

In some embodiments the controller 140 is arranged to control the vehicle 100 to reduce particulate emissions and consume a certain amount of purge vapour in addition to a reduction in fuel consumption. It is to be understood that particulate emissions and purge vapour consumption are of particular concern in the operation of internal combustion engines powered by petroleum fuels.

In one example, offline optimisation was performed using an application of game theory as outlined above in an attempt to reduce NOx emissions. The solution was evaluated experimentally in an HEV provided with a diesel engine. To aid comparison the same HEV was operated with a rule-based strategy calibrated approximately to replicate a deterministic dynamic programming-based solution over the NEDC drive cycle.

The results showed that the game theory controller, with minimal calibration effort, matched the performance of the rule-based controller. At the same time, the game theory controller outperformed the rule-based controller over drive cycles more closely approximating those encountered when driving on public roads.

It is to be understood that other arrangements are also useful.

In one alternative embodiment a vehicle is provided having a controller similar to that of the embodiment of FIG. 1. The following operating parameters are employed as inputs to a discretiser module and mode arbitrator module of the controller: i) wheel speed, ii) wheel torque desired by the driver, iii) battery state of charge and iv) engine temperature. Neither engine speed nor crankshaft speed are used in this alternative embodiment. This is because the controller is arranged to provide a list of two or more possible operational modes of the vehicle 100 including possible gears to engage based on the operating parameters input.

The operating modes are similar to those of the embodiment of FIG. 1 described above, i.e. a parallel recharge mode, a parallel boost mode and an electric vehicle (EV) mode. In this embodiment the value of CIMG torque and ICE state (on or off) are again optimised offline using a similar implementation of game theory to that described above in respect of the embodiment of FIG. 1.

Example

In the following discussion experimental results are provided that were obtained using a Land Rover Freelander2® HEV prototype vehicle 200 illustrated schematically in FIG. 2.

Figure 2:
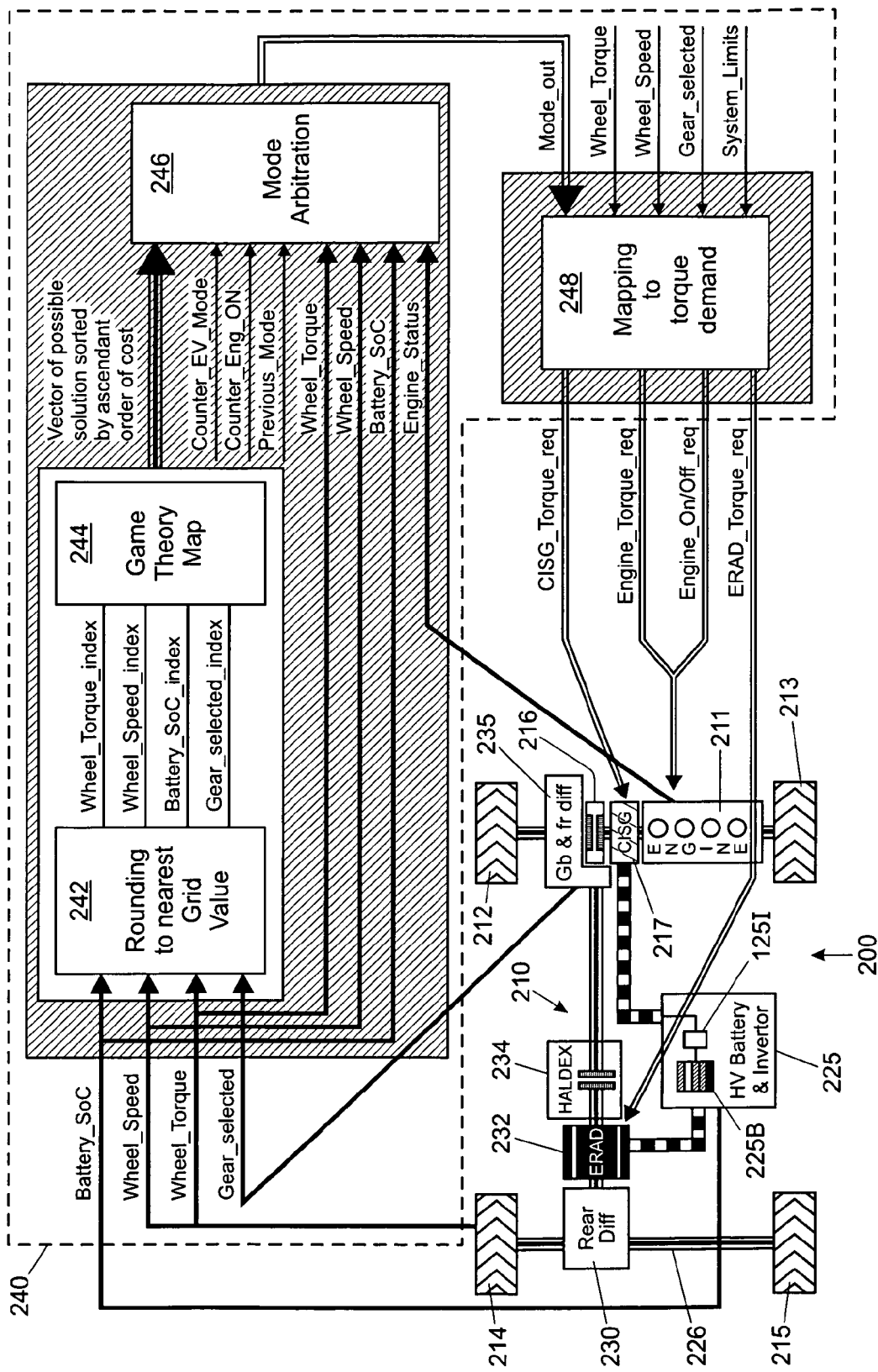
FIG. 2 is a schematic illustration of a hybrid electric vehicle according to a further embodiment of the present invention.

Like features of the vehicle 200 of FIG. 2 to the vehicle 100 of FIG. 1 are shown with like reference signs prefixed numeral 2 instead of numeral 1.

As discussed below the prototype vehicle 200 was used to implement energy management controllers having different respective configurations in order to aid comparison between embodiments of the present invention and controllers not implementing a game theory control methodology.

As noted above the vehicle 200 was a Freelander2® HEV prototype based on a Land Rover Freelander2 TD4® with automatic transmission. The powertrain of the vehicle 200 was modified from the standard production vehicle to replace the automatic transmission by a prototype six-speed dual clutch fully-automated manual transmission in which a crankshaft integrated starter/generator (CISG) 217 was provided between a dual mass flywheel of the diesel engine 211 (type DW12-b) and the clutches 216.

Towards a rear of the vehicle 200 an electric motor 232 was provided that was integrated within a rear differential 230 and permanently geared to a rear axle 226 of the vehicle 200. This motor arrangement may be referred to as an electric rear axle drive (ERAD) 232.

The controller 240 of the vehicle (which may be referred to as a vehicle systems controller or VSC) was configured to operate in a similar manner to the controller 140 of the vehicle 100 of FIG. 1. That is, the controller 240 had a discretiser module 242, a map module 244, a mode arbitrator 246 and a torque mapping module 248 similar to the embodiment of FIG. 1.

The following operating parameters were employed as inputs to the discretiser module 242 and mode arbitrator module 246 of the controller 240: i) a value of a speed of a wheel (Wheel_Speed), ii) a value of a wheel torque desired by the driver (Wheel_Torque), iii) a value of a battery state of charge (Battery_SoC) and iv) currently selected gear. Neither engine speed nor crankshaft speed were used in this example. This is because the controller was arranged to provide a list of two or more possible operational modes of the vehicle 200 including possible gears to engage based on the operating parameters input.

Tables 2 and 3 summarize feasible hybrid powertrain operating modes that were considered in performing optimization of the control process of the vehicle 200. These modes correspond to different combinations of CISG 217 and ERAD 232 operating states. These states are referred to as i) a regen state, ii) an inactive state and iii) a drive state.

In the regen state of the CISG 217 the CISG 217 is employed to act as a generator. The ERAD 232 is not arranged to act as a generator unless regenerative braking is required (Table 3).

When the CISG 217 is in the inactive state it does not generate electric power or provide a torque to the gearbox 218 and front differential 235. Similarly when the ERAD 232 is in the inactive state it does not provide a torque to the rear axle 226.

In the drive state of the CISG 217 the CISG 217 is employed as a motor to assist the ICE 211 (in a parallel boost mode requiring CISG 217 operation) to provide torque to wheels of the vehicle 200.

In the drive state of the ERAD 232 the ERAD 232 provides torque to the rear axle 226.

The emissions targets that were required to be achieved by the vehicle 200 over the NEDC drive cycle are based on the EURO 4 diesel class 3 vehicle standards and are summarized in Table 4.

In some embodiments, simultaneous optimisation of gear shifts and battery power output were performed. In the present example however such optimisation was not performed.

A gear shift map was generated that was optimised to reduce NOx emissions. The optimisation took into account the fact that when operating in a parallel mode, the engine 211 and CISG 217 may be controlled to optimise an operating condition of the engine 211 to an efficient load region.

Figure 3:
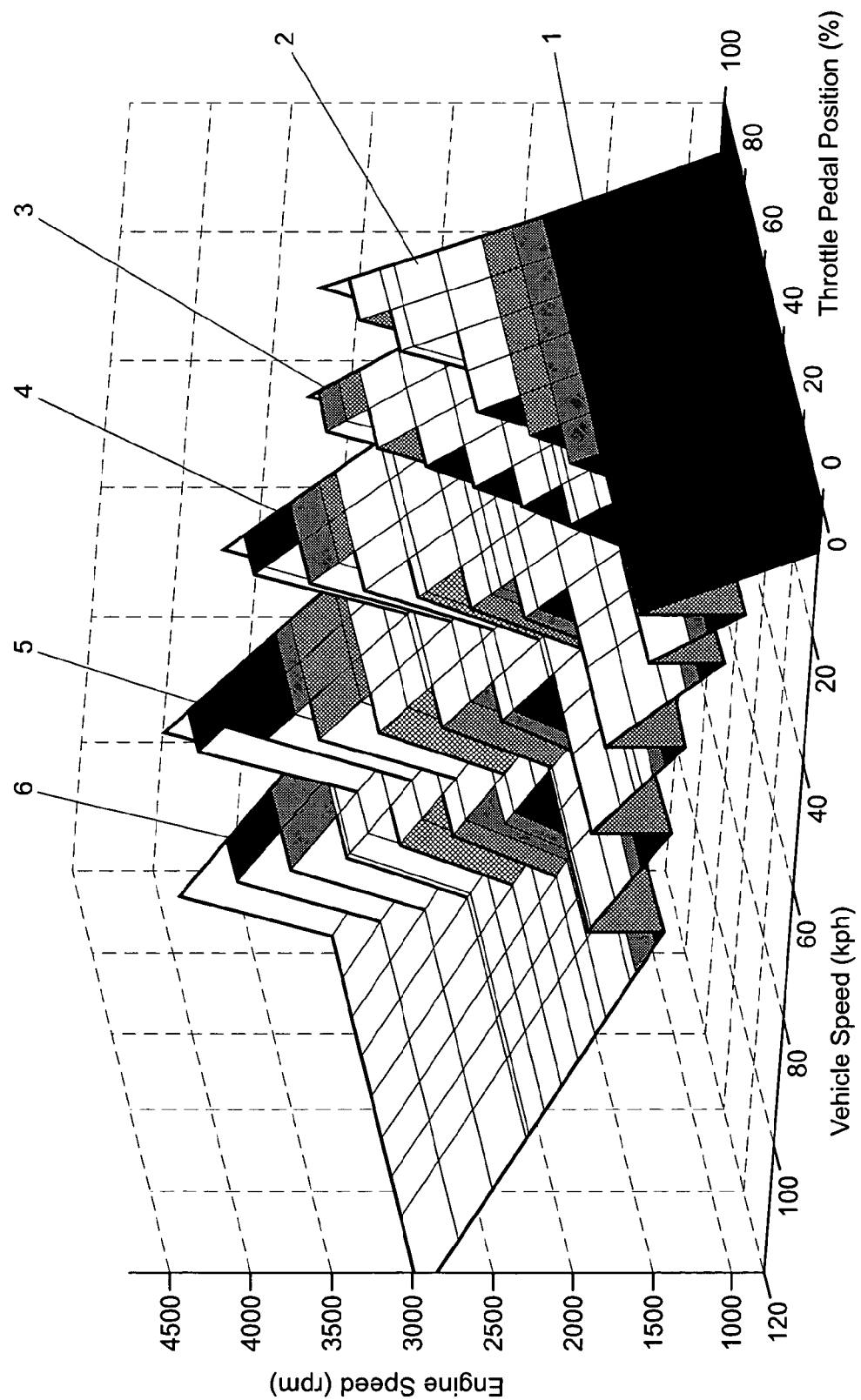
FIG. 3 is a plot showing optimum gear selection as a function of vehicle speed and pedal position with engine speed shown on the vertical axis for a vehicle according to an embodiment of the invention.

FIG. 3 is an up-shift map generated according to the optimisation method for the vehicle of FIG. 2. The map shows selected gear (gears 1 to 6) as a function of throttle pedal position and vehicle speed with engine speed plotted on the vertical axis.

The up-shift map and a corresponding down-shift map were loaded into a controller of the gearbox 235 to allow the controller to select an optimum gear for a given set of operating parameters.

Figure 4:
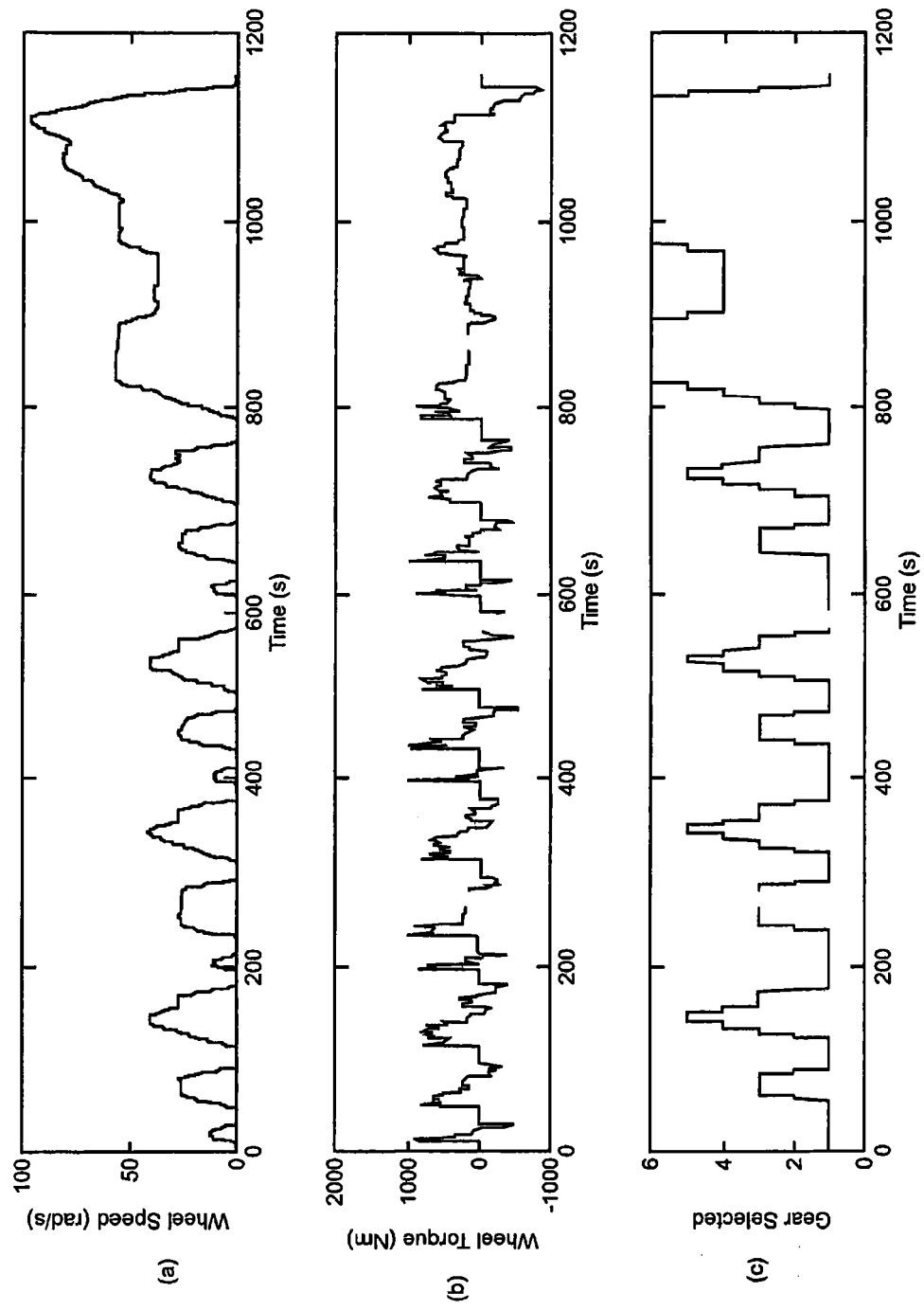
FIG. 4 is a plot of (a) wheel speed, (b) wheel torque and (c) gear as a function of time for the vehicle of FIG. 2 over an NEDC (New European Driving Cycle) drive cycle.

The vehicle 200 was then run on a rolling road over the NEDC drive cycle. The resulting time histories of wheel speed, wheel torque and gear are shown in FIG. 4(a) to (c) respectively. From this test the following data were extracted: i) a baseline to compare emission and fuel consumption between different controllers and ii) wheel speed and torque demand over the NEDC drive cycle as an input to the offline optimisation algorithms.

Dynamic Programming Solution Using Offline Simulation Model

Optimal deterministic dynamic programming trajectories were generated offline using a simulation model as described in further detail below. A rule-based control strategy was then tuned using these trajectories and evaluated in experiments using the vehicle of FIG. 2. The controller 140 of the vehicle was programmed according to this alternative control model.

A control-oriented simulation model of the vehicle of FIG. 2 was created using the following components: i) steady state engine outputs corresponding to the amount of NOx generated and Brake Specific Fuel Consumption; ii) CISG 217 motor/generator efficiency and inverter 2251 efficiency; iii) ERAD 232 motor/generator efficiency and inverter efficiency; iv) gearbox 218 efficiency; and v) battery 225B efficiency. The dynamic programming solution employed pattern recognition in the driving cycle to create a rule-based control strategy for implementation in the VSC.

A discrete set of vehicle operating modes was defined as follows: i) EV mode, where the ERAD 232 only is used to provide the driver torque demand to the wheels; ii) engine only mode; iii) a set of parallel charge modes, where CISG 217 torque is set to a negative torque and the engine provides the driver demanded torque plus the CISG 217 demanded torque; and a set of parallel boost modes, where the CISG torque is set to a defined positive torque and the ICE 211 provides the balance of the driver demanded torque.

The dynamic programming method was applied to the optimisation of the cost functional based on the incremental cost function of the form:

$$L(x,u,w) = \alpha \times \text{Fuel} + \beta + \text{NOx} + \mu \times [SoC_{SetPoint} - f(x,u,w)]^2. \quad (1)$$

where $u \in U$ is the control (powertrain operating mode in our case), $x \in X$ is the state (high voltage battery SoC in our case) and $w \in W$ is the vector of operating variables which is also referred to as the load site (wheel speed, wheel torque and gear selected in the present case). In (1), Fuel denotes engine fuel consumption, NOx denotes engine NOx emission mass flow rate, $SoC_{SetPoint}$ denotes the desired battery SoC setpoint at the end of the cycle and $f(x,u,w)$ denotes the SoC resulting from a defined control action at a given load site starting from a given SoC.

The dynamic programming method reduces to the backward in time iterative construction of the cost-to-go function. This approach of going from the end of the cycle to the beginning of the cycle enables the cost of each control vector, at a defined point of the cycle and defined state of the system, to reflect what could happen next if the optimal control action is taken. If t denotes the time instant during the cycle and V denotes the cost-to-go function, the iterations take the following form:

$$\begin{cases} V(x,t) = \min_{u(t) \in U} \{L(x,u,w) + V(f(x,u,w(t)), t+1)\}, t \in [T-1; 1] \quad (2) \\ V(x,T) = \mu \times [SoC_{SetPoint} - x]^2, \text{ is the terminal cost.} \end{cases}$$

At each time step throughout the cycle, the total cost K will be:

$$K(x,u,t) = L(x,u,w(t)) + V(f(x,u,w(t)), t+1). \quad (3)$$

Once the cost-to-go function has been constructed, the optimal control can be determined as follows:

$$u_{opt}(x,t) \in \underset{u(t) \in U}{\text{argmin}} \{K(x,u,t)\}. \quad (4)$$

Figure 5:
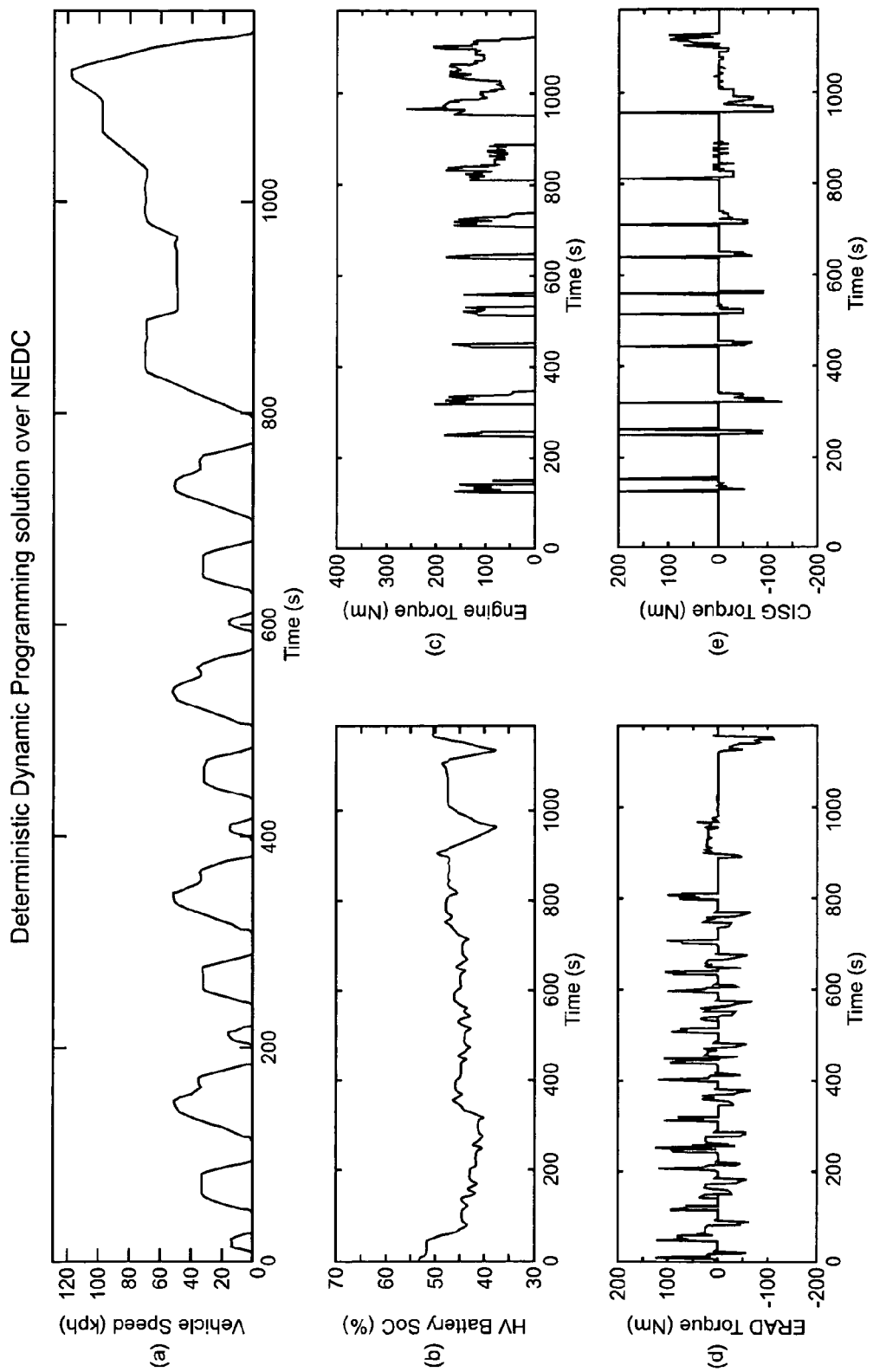
FIG. 5 is a plot of (a) vehicle speed, (b) battery state of charge (SoC), (c) engine torque, (d) electric rear axle drive (ERAD) torque and (e) crankshaft integrated starter generator (CISG) torque as a function of time over the NEDC drive cycle for the vehicle of FIG. 2 fitted with a rule-based controller configured according to a deterministic dynamic programming optimisation solution instead of a controller according to an embodiment of the present invention.

The optimal trajectories over the NEDC drive cycle generated by the deterministic dynamic programming algorithm and simulated using a model of the vehicle of FIG. 2 are illustrated in FIG. 5.

A simulated NOx EURO4 compliant solution gave a saving of 25% of $CO_2$ compared to the same vehicle running in conventional (non-HEV) mode.

Application of Game Theory to HEV Control

The non-cooperative approach of game theory was applied to the control of the vehicle of FIG. 1 and FIG. 2 by considering a multi-stage game played by the following two players:

a) a first player, the driver, represented by a discrete set of load sites (for example wheel torque, wheel speed and gear selected), covering the powertrain capability, and b) a second player, the powertrain, represented by a discrete set of operating modes. The approach described herein is suitable for use in other embodiments also.

The first player is interested in minimizing a cost functional while the second player is interested in maximizing the cost functional. The cost functional is formed as a sum of incremental cost values over a finite horizon.

In respect of the embodiment of FIG. 2 the cost functional of the game is based on the following incremental cost function L related to the control action, u, the state vector, x, and the operating variable, w:

$$L(x,u,w) = \alpha \times \text{Fuel}(u,w) + \beta \times \text{NOx}(u,w) + \mu \times [\text{SoC}_{SetPoint} - (x - \Delta\text{SoC}(u,w))]^2 + \gamma \times G(w) \quad (5)$$

where u∈U is the control action (U is the set of powertrain operating mode in this case), x∈X is the state vector (X is the set of discretised high voltage battery SoC values in this case) and W∈W is the vector of operating variables which is also referred to as the load site (discretised wheel speed, wheel torque and gear selected in this case). In (1), Fuel denotes engine fuel consumption, NOx denotes engine NOx emission mass flow rate, $\text{SoC}_{SetPoint}$ denotes the desired SoC set-point at the end of the cycle, $\Delta\text{SoC}(u, w)$ denotes the deviation of SoC resulting from a defined control action at a given load site. Here G denotes a positive Gaussian function with the centre at the centre of mass of a defined drive cycle, introduced to focus the optimization on specific load sites.

In respect of the embodiment of FIG. 1 the cost functional of the game is based on the following incremental cost function L related to the control action, u, the state vector, x, and the operating variable, w:

$$L(x,u,w) = \alpha \times \text{Fuel}(u,w) + \beta \times \text{NOx}(u,w) + \sigma \times [T_{EngCoolant\;SetPoint} - (x(1) - \Delta Tc(u,w))]^2 \mu \times [\text{SoC}_{SetPoint} - (x(2) - \Delta\text{SoC}(u,w))]^2 + \gamma \times G(w) \quad (6)$$

where u, the control action, is a member of U (U is the set of powertrain operating mode in this case), x(1), the engine coolant temperature is a member of X(1) (X(1) is the set of discretised coolant temperature in this case), x(2), the state of charge is a member of X(2) (X(2) is the set of discretised high voltage battery SoC values in this case) and w, the vector of operating variables which is also referred to as the load site, is a member of W (W is the set of discretised gearbox input shaft speed, gearbox input shaft torque in this case).

Fuel denotes engine fuel consumption, NOx denotes engine NOx emission mass flow rate, $T_{EngCoolantSetPoint}$ denotes the desired set point for engine coolant temperature at the end of the cycle, $\Delta Tc(u, w)$ denotes the deviation of engine coolant temperature resulting from a defined control action at a given load site, $\text{SoC}_{SetPoint}$ denotes the desired SoC set-point at the end of the cycle, $\Delta\text{SoC}(u, w)$ denotes the deviation of SoC resulting from a defined control action at a given load site. Here G denotes a positive Gaussian function with the centre at the centre of mass of a defined drive cycle, introduced to focus the optimization on specific load sites.

The control policy is based on a constructed off-line feedback Stackelberg equilibrium of the game. The process to construct this solution is based on the following iterations, applied to the cost-to-go function, V:

$$\begin{cases} V(x, T) = \max_{w \in W} \min_{u \in U} \{L(x, u, w)\} & (6) \\ V(x, t) = \max_{w \in W} \{v(x, w, t)\}, t \in [T-1, T-2, \cdots, 0]. \\ v(x, w, t) = \min_{u \in U} \{L(x, u, w) + V(f(x, u, w), g(x, u, w), t+1)\}, \\ t \in [T-1, T-2, \cdots, 0] \end{cases}$$

Here f(x,u,w) denotes the engine coolant temperature resulting from a defined control action at a given load site and starting from a given engine coolant temperature, x(1):

$$f(x,u,w) = x(1) - \Delta Tc(u,w).$$

g(x,u,w) denotes the battery SoC resulting from a defined control action at a given load site and starting from a given SoC, x(2):

$$g(x,u,w) = x(2 - \Delta\text{SoC}(u,w)).$$

The control policy is defined as:

$$u(x, w) \in \underset{u \in U}{\operatorname{argmin}}\{L(x, u, w) + V(f(x, u, w), g(x, u, w), 0\} \quad (7)$$

In the case of the embodiment of FIG. 2, ∀x∈X, ∀u∈U, ∃w∈W, g(x,u,w)=0.

The solution is constructed offline using a grid for state, control, and load site values and interpolated on-line to generate the control action.

It is to be understood that, for a sufficiently large number of stages, T, the algorithm will converge towards a quasi-optimal, time and drive-cycle independent solution which is also independent of T.

Vehicle Evaluation Results

NEDC Results of the Freelander2 HEV with Rule Based Controller Based on Dynamic Programming Solution Using the optimal trajectories discussed above, a rule-based controller was created to provide the vehicle with a behaviour that replicated the offline solution including stop/start of the engine and charge/discharge of the battery over the NEDC drive cycle. Thus, for a given set of inputs of vehicle operational parameters the controller was arranged to determine optimal operating states of the ICE 211, CISG 217 and ERAD 232.

In a parallel mode, the torque split is between the ICE 211 and CISG 217. The ERAD 232 is arranged only to apply torque if the driver demanded torque exceeds the maximum torque deliverable by the ICE 211 and CISG 217 together. Such a situation would not occur over the NEDC cycle but might occur in a 'real-world' situation during the course of driving the vehicle in 'real-life' situations (such as when ascending certain steep inclines under certain conditions) or off-road under certain circumstances.

Figure 6:
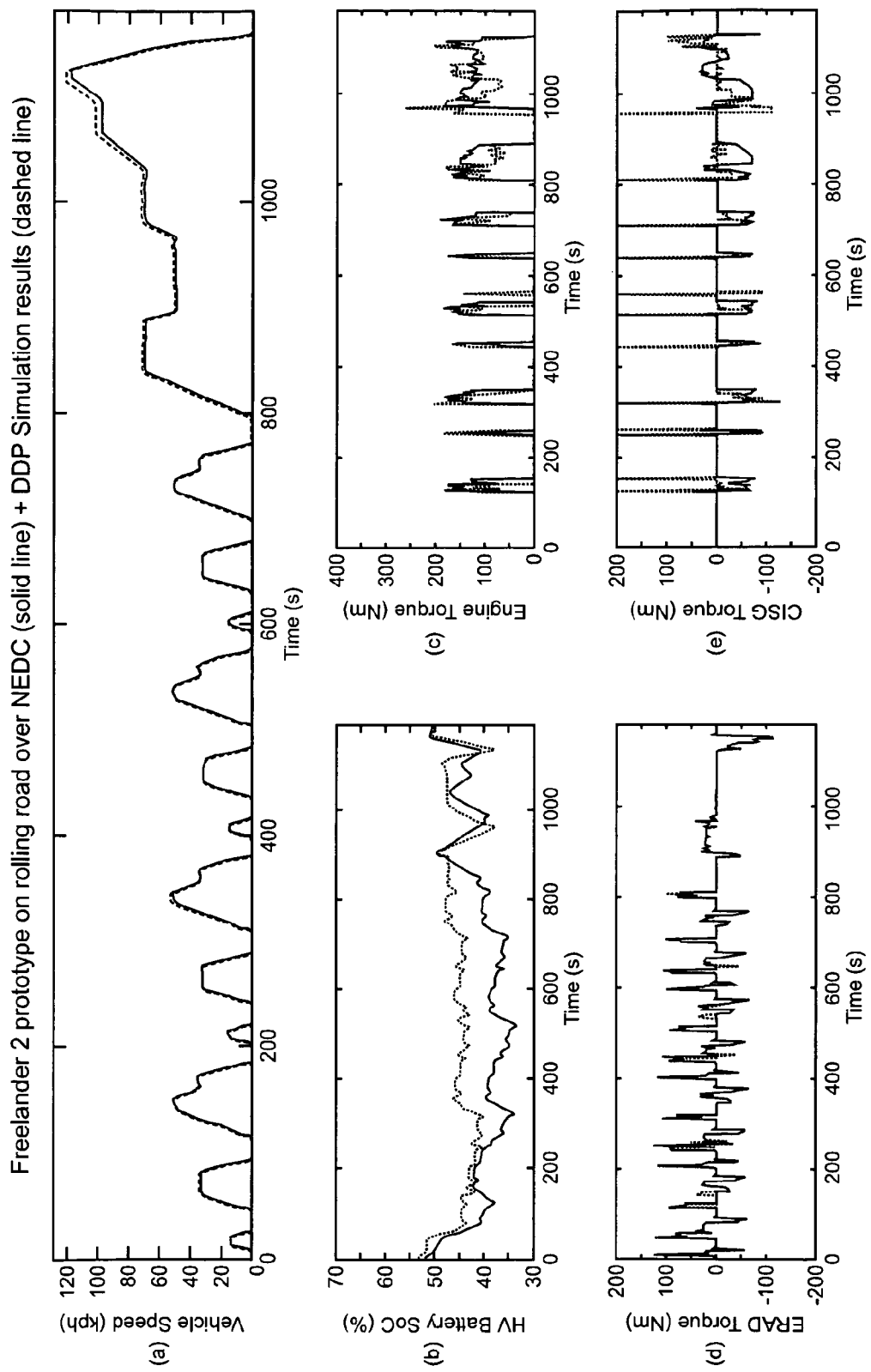
FIG. 6 is a plot of (a) vehicle speed, (b) battery SoC, (c) engine torque, (d) ERAD torque and (e) CISG torque as a function of time over the NEDC drive cycle obtained using a rolling road (solid line) compared with DDP simulation results (dotted line) for the vehicle of FIG. 2 having a controller arranged to implement a rule-based dynamic programming control method instead of a controller according to an embodiment of the present invention.

FIG. 6 illustrates the prototype operating points over the NEDC cycle, and also overlays the prototype results with the simulation results.

This solution resulted in a 21.5% $CO_2$ saving over the NEDC drive cycle, was EURO4 compliant and the battery SoC was balanced over the cycle.

The baseline vehicle for this comparison was the same vehicle running in engine only mode. A feedback loop was employed in respect of the CISG torque acting as an alternator in order to sustain the energy drained by the 12V system over the cycle. A lighter road load was also employed to replicate the mass of a conventional (non-HEV) Freelander2 diesel vehicle.

NEDC Results of the Freelander2 HEV with Game Theory Controller

As described above in respect of the embodiment of FIG. 1, in the embodiment of FIG. 2 the controller 240 of the vehicle 200 was provided with a set of offline computed maps (generated using the game theory implementation described above) representing the condition of the ICE 211 (i.e. engine on or off) and mode of operation of the vehicle. If the selected mode is a parallel mode the map provides the CISG target torque value as described above.

The vehicle 200 delivered a 22.5% reduction in $CO_2$ compared to the baseline vehicle.

Figure 7:
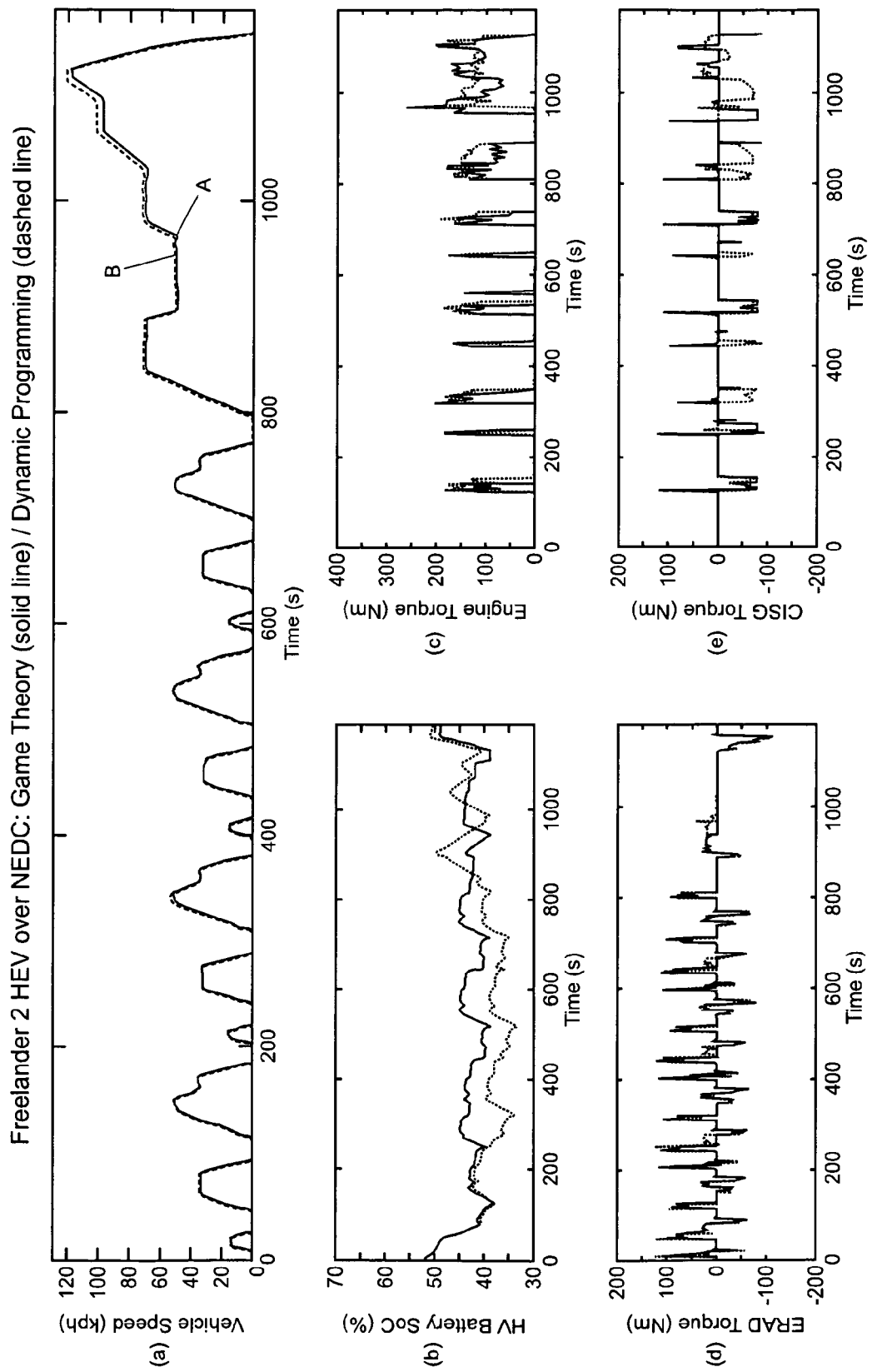
FIG. 7 is a plot of (a) vehicle speed, (b) battery SoC, (c) engine torque, (d) ERAD torque and (e) CISG torque as a function of time over the NEDC drive cycle showing data for a vehicle according to FIG. 2 having a controller according to an embodiment of the present invention (solid line) and a similar vehicle fitted instead with a rule-based controller configured according to the deterministic dynamic programming optimisation solution (dashed line).

It is noted that the controller 240 (being an embodiment of the present invention) was calibrated for drivability on a particular test track whilst the rule based controller was not and did not provide the same level of drivability. Vehicle trajectories over the NEDC drive cycle with the controller 240 are shown in FIG. 7.

Table 5 presents a comparison of controllers based on deterministic dynamic programming and game theory respectively relative to results obtained from the baseline vehicle. The controller 240 according to the present invention (game theory optimised) demonstrates better fuel economy and substantially better NOx emissions as compared to the rule-based controller calibrated from dynamic programming results.

The game theory-based controller 240 is also drive cycle independent. Hence it is to be expected that the game theory-based controller 240 will perform well over drive cycles other than the NEDC drive cycle and will perform better than a rule-based controller calibrated using dynamic programming results as discussed above.

The two controllers have been benchmarked against each other over the NEDC drive cycle, HYZEM phase 2 drive cycle (urban phase of the HYZEM drive cycle) and Federal Test Procedure (FTP) 75 drive cycle with results as summarized in Table 6.

It can be observed that over the three different drive cycles, the game theory controller 240 with minimum calibration effort provides better fuel economy and NOx emissions than a rule based controller calibrated for a specific drive cycle.

Aspects or embodiments of the invention for which protection is sought may be understood with reference to the following numbered paragraphs:

1. A controller for a hybrid electric vehicle having a plurality of actuators each operable to provide torque to drive the vehicle, at least one of the actuators being arranged to consume a fuel, at least one of the actuators comprising an electric machine operable to be powered by the energy storage means,
the controller being operable to determine a required torque split between the plurality of actuators responsive to a first set of two or more operating parameters of the vehicle, the torque split being a proportion of the total torque that is to be provided to the driveline by each actuator, the torque split being determined by reference to one or more stored torque split data maps.

2. A controller as described in paragraph 1 wherein the data maps are data maps generated offline according to an algorithm arranged to optimise the required torque split to reduce a value of one or more performance parameters of the vehicle being parameters indicative of a performance of the vehicle.

3. A controller as described in paragraph 1 wherein the performance parameters correspond to at least one selected from amongst a rate of fuel consumption of the vehicle, a rate of emission of a gas by the vehicle, a deviation from a nominal value of a state of charge of an energy storage device arranged to power one or more of the plurality of actuators and a noise level generated by the vehicle.

4. A controller as described in any preceding paragraph arranged to discretise values of each of the first set of operating parameters to values corresponding to coordinates of data stored in the one or more data maps, and to input these discretised values to the one or more data maps thereby to access data stored therein.

5. A controller as described in paragraph 4 wherein one said one or more stored data maps is arranged to store data corresponding to a list of operational modes of the vehicle ranked according to a cost functional of the vehicle for a given set of discrete values of the first set of operating parameters.

6. A controller as described in paragraph 5 wherein at least a plurality of the operational modes correspond to a different value of torque to be demanded from one or more of the actuators.

7. A controller as described in paragraph 5 or paragraph 6 arranged to provide the data corresponding to the list of operational modes to a mode arbitrator arranged to determine a required operational mode of the vehicle based on the data corresponding to the list of operational modes and non-discretised values of the first set of operating parameters.

8. A controller as described in paragraph 7 arranged to provide the required operational mode of the vehicle determined by the mode arbitrator to a torque demand module, the torque demand module being arranged to determine values of torque to be demanded from each of the plurality of actuators based on the required operational mode and non-discretised values of one or more of the first set of operating parameters.

9. A controller as described in paragraph 7 or paragraph 8 arranged to output a signal indicative of at least one selected from amongst a required gear to be engaged by a gearbox, an amount of exhaust gas to be recirculated by an exhaust gas recirculation (EGR) system and an amount of purge vapour to be transferred from an evaporative emission trap to an intake system of the vehicle.

10. A controller as described in any preceding paragraph wherein the at least one data map is a data map generated according to a non-cooperative game theory with Stakelberg equilibrium model.

11. A controller as described in any preceding paragraph wherein one of the at least one actuators arranged to consume a fuel comprises an internal combustion engine.

12. A controller as described in any preceding paragraph wherein one of the actuators comprises an electric motor operable to apply a positive torque to the driveline.

13. A controller as described in any preceding paragraph wherein one of the actuators comprises an electric generator operable to apply a negative torque to the driveline.

14. A controller as described in any preceding paragraph wherein one of the actuators comprises a motor/generator operable to apply either a positive or a negative torque to the driveline as required.

15. A controller as described in any preceding paragraph wherein the operational parameters include at least one selected from amongst a driveline speed, a drivelines torque being a value of driveline torque demanded by a driver of the vehicle, a battery state of charge, an engine temperature, an engine coolant temperature, an exhaust gas temperature, a state of a gearbox of the vehicle being a gear ratio of the gearbox, a wheel speed and a wheel torque being a value of wheel torque demanded by a driver of the vehicle.

The driveline torque may be a crankshaft torque and the driveline speed may be a crankshaft speed.

16. A controller as described in any preceding paragraph wherein the operational parameters include a crankshaft speed, a crankshaft torque being a value of crankshaft torque demanded by a driver of the vehicle, a battery state of charge and an engine temperature.

17. A controller as described in any preceding paragraph wherein the operational parameters include a wheel torque, a wheel speed, an engine coolant temperature, a battery state of charge and a state of a gearbox of the vehicle being a gear ratio of the gearbox.

18. A method of controlling a hybrid electric vehicle having a plurality of actuators each operable to provide torque to a driveline of the vehicle, at least one of the actuators being arranged to consume a fuel and at least one of the actuators comprising an electric machine operable to be powered by energy storage means, comprising the steps of:
receiving at a controller data corresponding to a plurality of operating parameters of the vehicle;
determining by means of the controller a required torque split between the plurality of actuators responsive to the received data, the torque split being a proportion of the total torque that is to be provided to the driveline by each actuator, the torque split being determined by reference to one or more stored torque split data maps; and
controlling the plurality of actuators to deliver the torque to the driveline according to the required torque split.

19. A method as described in paragraph 18 comprising the step of generating the one or more data maps offline according to an algorithm arranged to optimise the torque split to reduce a value of one or more parameters of the vehicle parameters indicative of a performance of the vehicle.

20. A method as described in paragraph 19 wherein the one or more parameters correspond to at least one selected from amongst a rate of fuel consumption of the vehicle, a rate of emission of a gas by the vehicle and a noise level generated by the vehicle.

21. A method as described in any one of paragraphs 18 to 20 comprising the step of discretising values of the plurality of operating parameters to values corresponding to coordinates of data stored in the one or more data maps.

22. A method as described in any one of paragraphs 18 to 21 comprising the step of storing in the one or more data maps data corresponding to a list of operational modes of the vehicle ranked according to a cost functional of the vehicle for a given set of discrete values of the plurality of operating parameters.

23. A method as described in paragraph 22 wherein at least a plurality of the operational modes correspond to a different value of torque to be demanded from one or more of the actuators.

24. A method as described in any one of paragraphs 22 or 23 wherein at least one operational mode corresponds at least one selected from amongst a required gear to be engaged by a gearbox, an amount of exhaust gas to be recirculated by an exhaust gas recirculation (EGR) system and an amount of purge vapour to be transferred from an evaporative emission trap to an intake system of the vehicle.

25. A method as described in any one of paragraphs 22 to 24 comprising the step of outputting the data corresponding to the list of operational modes to a mode arbitrator, the method further comprising determining by the mode arbitrator a required operational mode of the vehicle based on the data corresponding to the list of operational modes and non-discretised values of the plurality of operating parameters.

26. A method as described in paragraph 25 comprising the step of outputting the required operational mode of the vehicle to a torque demand module, the method further comprising determining by means of the torque demand module values of torque to be demanded from each of the plurality of actuators based on the required operational mode and non-discretised values of one or more of the operating parameters.

27. A method as described in any one of paragraphs 18 to 26 comprising the step of generating the at least one data map according to a non-cooperative game theory with Stakelberg equilibrium model.

28. A method as described in any one of paragraphs 18 to 27 wherein the step of controlling the plurality of actuators to deliver the torque to the driveline according to the required torque split comprises the step of controlling an internal combustion engine.

29. A method as described in any one of paragraphs 18 to 28 wherein the step of controlling the plurality of actuators to deliver the torque to the driveline according to the required torque split comprises the step of controlling an electric motor operable to apply a positive torque to the driveline.

30. A method as described in any one of paragraphs 18 to 29 wherein the step of controlling the plurality of actuators to deliver the torque to the driveline according to the required torque split comprises the step of controlling an electric generator operable to apply a negative torque to the driveline.

31. A method as described in any one of paragraphs 18 to 30 wherein the step of controlling the plurality of actuators to deliver the torque to the driveline according to the required torque split comprises the step of controlling a motor/generator operable to apply either a positive or a negative torque to the driveline as required.

32. A method as described in any one of paragraphs 18 to 31 wherein the operational parameters include at least one selected from amongst a crankshaft speed, a crankshaft torque being a value of crankshaft torque demanded by a driver of the vehicle, a battery state of charge, an engine temperature, a state of a gearbox of the vehicle being a gear ratio of the gearbox, a wheel speed and a wheel torque.

33. A method as described in any one of paragraphs 18 to 32 wherein the operational parameters include a crankshaft speed, a crankshaft torque being a value of crankshaft torque demanded by a driver of the vehicle, a battery state of charge and an engine temperature.

34. A method as described in any one of paragraphs 18 to 33 wherein the operational parameters include a wheel torque, a wheel speed, a battery state of charge and a state of a gearbox of the vehicle being a gear ratio of the gearbox.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:
1. A controller for a hybrid electric vehicle having a plurality of actuators, at least one of the actuators being arranged to consume a fuel and at least one of the actuators comprising an electric machine operable to be powered by an energy storage device;

the controller being operable to control the plurality of actuators to apply respective amounts of torque to a driveline of the vehicle according to one of a plurality of operational modes of the vehicle in dependence on a value of a first set of two or more operating parameters of the vehicle, the controller being arranged to select two or more of the operational modes in dependence on the first set of operating parameters, the modes being selected in dependence on a value of a cost functional, a first of the selected modes being the mode having the lowest cost functional according to a control optimisation methodology implemented by the controller;

wherein the controller is arranged to control the vehicle to assume the first of the selected modes and in the event the first selected mode is unavailable the controller is arranged to control the vehicle to assume another of the selected modes.

2. A controller as claimed in claim 1 wherein each operational mode corresponds to a different respective torque split between the plurality of actuators, the torque split representing the proportion of the total torque that is to be applied by each actuator.

3. A controller as claimed in claim 1 wherein at least one of the operational modes is a mode in which the at least one fuel consuming actuator drives an electric machine to generate charge to charge the energy storage device.

4. A controller as claimed in claim 1 wherein if the first mode is a mode in which the at least one fuel consuming actuator is employed, at least one of the selected modes includes the mode in which the at least one fuel consuming actuator is not employed that has the lowest cost functional.

5. A controller as claimed in claim 1 wherein if the first mode is a mode in which the at least one fuel consuming actuator is not employed, at least one of the selected modes includes the mode having the lowest cost functional in which the at least one fuel consuming actuator is employed.

6. A controller as claim in claim 1, wherein the controller is arranged to determine the torque split by reference to one or more stored torque split data maps.

7. A controller as claimed in claim 6 wherein the data maps are data maps generated offline according to the control optimisation methodology.

8. A controller as claimed in claim 6 wherein the controller is arranged to discretise values of the first set of two or more operating parameters to values corresponding to those of data stored in the one or more data maps.

9. A controller as claimed in claim 1 wherein the cost functional is responsive to at least one selected from amongst a rate of fuel consumption of the vehicle, a rate of emission of a gas by the vehicle, an amount of noise generated by the vehicle, a deviation of a state parameter from a prescribed value and a rate of emission of one or more types of particulate material.

10. A controller as claimed in claim 9 wherein the cost functional is responsive to a rate of fuel consumption of the vehicle, a rate of emission of a gas by the vehicle and a deviation of a state parameter from a prescribed value, the controller being operable to determine a required operation mode according to a feedback Stackelberg equilibrium control optimisation methodology.

11. A controller as claimed in claim 9 wherein the state parameter corresponds to a value of a state of charge of the energy storage device.

12. A controller as claimed in claim 1, wherein the controller is arranged to determine the required operational mode of the vehicle from the selected two or more modes responsive to non-discretised values of one or more of the first set of two or more operating parameters.

13. A controller as claimed in claim 1 wherein the controller is arranged to determine the required operational mode from the selected two or more modes and to output the required mode to a torque demand module, the torque demand module being arranged to determine a value of torque to be demanded from each of the plurality of actuators based on the required operational mode, a value of one or more of the first set of two or more operating parameters and data in respect of one or more system state parameters of the vehicle, the torque demand module being configured to demand a required amount of torque from the actuators responsive to the values of the one or more system state parameters.

14. A controller as claimed in claim 1 wherein at least one of the plurality of actuators comprises an internal combustion engine.

15. A controller as claimed in wherein one of the actuators comprises an electric motor operable to apply a positive torque to the driveline.

16. A controller as claimed in claim 1 wherein one of the actuators comprises an electric generator operable to apply a negative torque to the driveline.

17. A controller as claimed in claim 1 wherein the actuator comprising an electric machine comprises an electric machine operable to apply either a positive or a negative torque to the driveline as required.

18. A controller as claimed in claim 1 wherein the first set of two more operating parameters includes at least one selected from amongst a speed of rotation of a portion of the driveline, a torque present at a portion of the driveline being a value of torque demanded by a driver of the vehicle at that portion, a battery state of charge, an engine temperature, an engine coolant temperature, an exhaust gas temperature, a state of a gearbox of the vehicle being a gear ratio of the gearbox.

19. A controller as claimed in claim 1 wherein the first set of two more operating parameters comprises a driveline torque, a driveline speed and a state of charge of the energy storage device.

20. A controller as claimed in claim 19 wherein the first set of two more operating parameters further comprises a temperature of the at least one fuel consuming actuator.

21. A controller as claimed in claim 19 wherein the first set of two or more operating parameters further comprises a state of a gearbox of the vehicle being a gear ratio of the gearbox.

22. A hybrid electric vehicle comprising a controller as claimed in claim 1.

23. A method of controlling a hybrid electric vehicle having a plurality of actuators each operable to provide torque to a driveline of the vehicle, at least one of the actuators being arranged to consume a fuel and at least one of the actuators comprising an electric machine operable to be powered by an energy storage device. the method comprising:

receiving at a controller a value of each of a first set of two or more operating parameters of the vehicle;

selecting two or more operational modes of the vehicle from a set of three or more operational modes responsive to the first set of operating parameters, each mode corresponding to a prescribed configuration of respective amounts of torque applied to the driveline by the plurality of actuators;

selecting the two or more modes responsive to a value of a cost functional, a first of the selected modes being the mode having the lowest cost functional according to a control optimisation methodology implemented by the controller;

controlling the vehicle to assume the first of the selected modes; and in the event the first selected mode is unavailable, controlling the vehicle to assume another of the two or more selected modes.

24. A method as claimed in claim 23 wherein if the first mode is a mode in which the at least one fuel consuming actuator is employed, the step of selecting two or more modes comprises selecting the mode in which the at least one fuel consuming actuator is not employed that has the lowest cost functional.

25. A method as claimed in claim 23 wherein if the first mode is a mode in which the at least one fuel consuming actuator is not employed, the step of selecting two or more modes comprises selecting the mode having the lowest cost functional in which the at least one fuel consuming actuator is employed.

26. A method as claimed in claim 23 wherein the step of selecting the two or more modes responsive to the value of the cost functional comprises the step of accessing a database in which the two or more modes corresponding to respective combinations of values of each of the first set of operating parameters are stored.

27. A method as claimed in claim 26 wherein the step of accessing the database comprises inputting to the database the value of each of the first set of operating parameters.

28. A method as claimed in claim 26 comprising the step of generating the identity of the selected two or more modes for each respective combination of values of each of the first set of operating parameters offline according to the control optimisation methodology.

29. A method as claimed in claim 26 comprising the step of discretising values of the first set of two or more operating parameters to values corresponding to coordinates of data stored in the database.

30. A method as claimed in claim 23 wherein the cost functional is responsive to at least one selected from amongst a rate of fuel consumption of the vehicle, a rate of emission of a gas by the vehicle, an amount of noise generated by the vehicle and a deviation of a value of a state parameter from a prescribed value.

31. A method as claimed in claim 30 wherein the cost functional is responsive to the deviation of the value of the state parameter from a prescribed value, the state parameter corresponding to a state of charge of the energy storage device.

32. A method as claimed in claim 23 wherein the cost functional is responsive to a rate of fuel consumption of the vehicle, a rate of emission of a gas by the vehicle and a deviation of a state of charge of the energy storage device from a prescribed value, the method comprising determining a required operational mode of the vehicle according to a feedback Stackelberg equilibrium control optimisation methodology.

* * * * *